Figure 1:
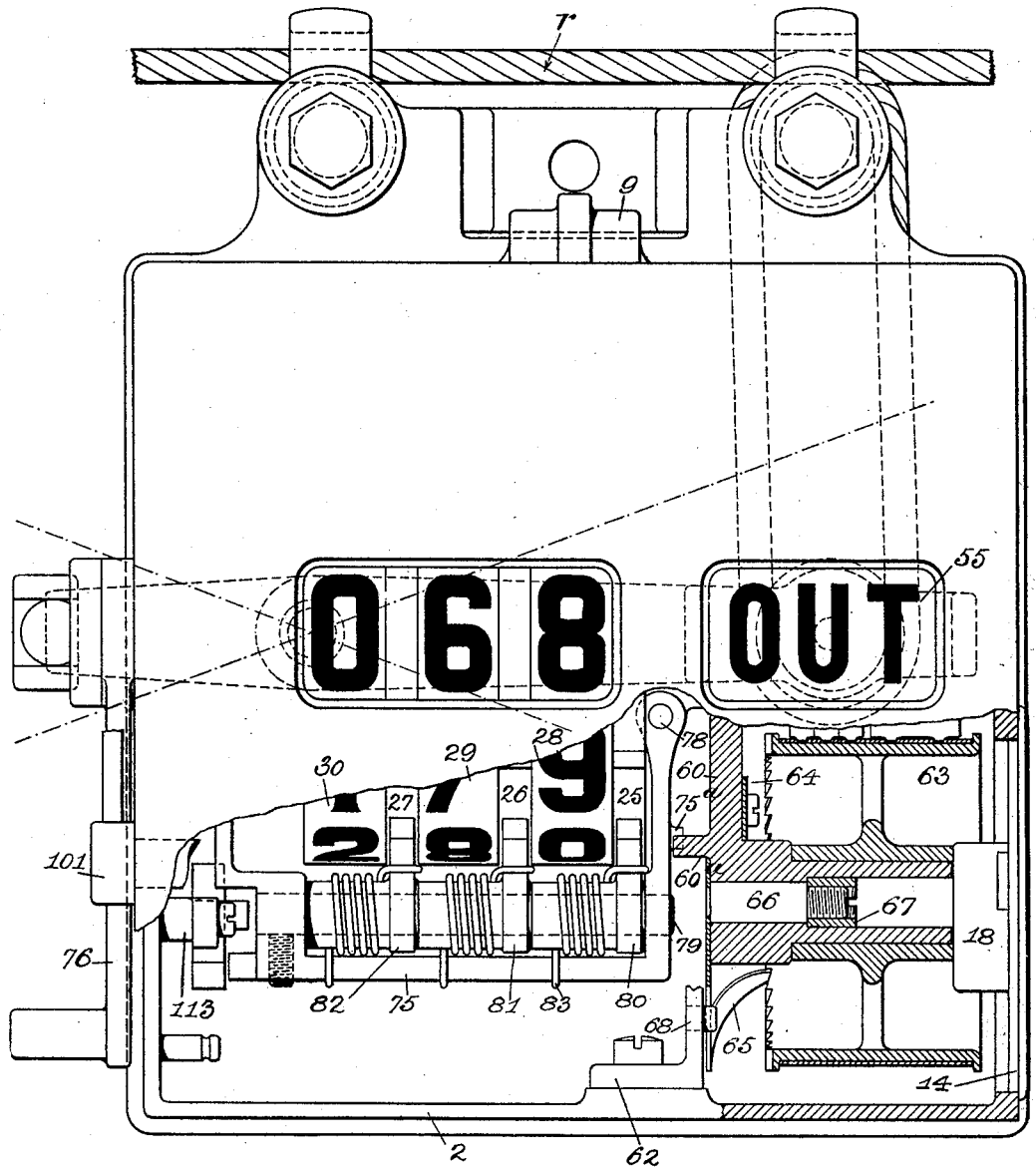

(No Model.) 12 Sheets—Sheet 1.
W. H. HONISS.
RECORDING FARE REGISTER.

No. 567,315. Patented Sept. 8, 1896.

Witnesses:
A. Mutter.
Jennie Kellis.

Inventor:
W. H. Honiss.

(No Model.) 12 Sheets—Sheet 2.

W. H. HONISS.
RECORDING FARE REGISTER.

No. 567,315. Patented Sept. 8, 1896.

Witnesses:
A. Mutter.
Jennie Nellis

Inventor:
W. H. Honiss.

(No Model.)  12 Sheets—Sheet 4.

W. H. HONISS.
RECORDING FARE REGISTER.

No. 567,315. Patented Sept. 8, 1896.

Witnesses:
A. Mutter.
Jennie Nellis

Inventor:
W. H. Honiss (No Model.) 12 Sheets—Sheet 5.

W. H. HONISS.
RECORDING FARE REGISTER.

No. 567,315. Patented Sept. 8, 1896.

Witnesses:
A. Mutter.
Jennie Nellis.

Inventor:
W. H. Honiss.

(No Model.) 12 Sheets—Sheet 6.

W. H. HONISS.
RECORDING FARE REGISTER.

No. 567,315. Patented Sept. 8, 1896.

Witnesses:
A. Mutter.
Jennie Nellis.

Inventor:
W. H. Honiss.

(No Model.) 12 Sheets—Sheet 7.

W. H. HONISS.
RECORDING FARE REGISTER.

No. 567,315. Patented Sept. 8, 1896.

Witnesses:
A. Mutter.
Jennie Nellis.

Inventor:
W. H. Honiss (No Model.) 12 Sheets—Sheet 8.

W. H. HONISS.
RECORDING FARE REGISTER.

No. 567,315. Patented Sept. 8, 1896.

Witnesses:
A. Mutter.
Jennie Kellis.

Inventor:
W. H. Honiss (No Model.) 12 Sheets—Sheet 9.
W. H. HONISS.
RECORDING FARE REGISTER.

No. 567,315. Patented Sept. 8, 1896.

Witnesses: Inventor:

(No Model.) 12 Sheets—Sheet 10.
W. H. HONISS.
RECORDING FARE REGISTER.

No. 567,315. Patented Sept. 8, 1896.

Witnesses:
A. Mutter.
Jennie Kellis.

Inventor:
W. H. Honiss (No Model.)  12 Sheets—Sheet 11.

W. H. HONISS.
RECORDING FARE REGISTER.

No. 567,315.  Patented Sept. 8, 1896.

Witnesses:
A. Mutter.
Jennie Nellis.

Inventor:
W. H. Honiss

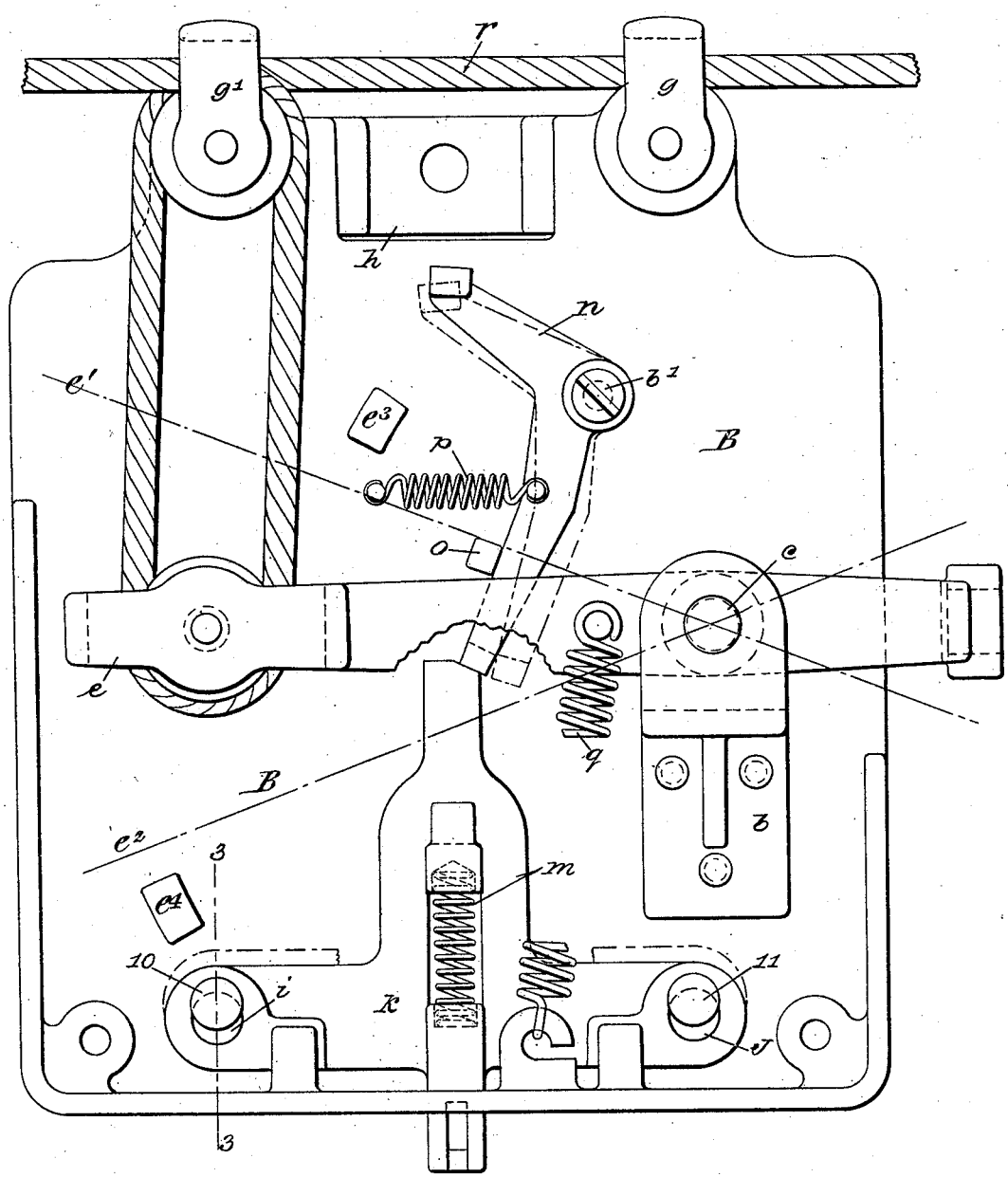

UNITED STATES PATENT OFFICE.

WILLIAM H. HONISS, OF HARTFORD, CONNECTICUT.

RECORDING FARE-REGISTER.

SPECIFICATION forming part of Letters Patent No. 567,315, dated September 8, 1896.

Application filed July 22, 1895. Serial No. 556,683. (No model.)

*To all whom it may concern:*

Be it known that I, WILLIAM H. HONISS, a citizen of the United States, residing at Hartford, in the county of Hartford and State of Connecticut, have invented certain new and useful Improvements in Recording Fare-Registers, of which the following is a full, clear, and exact specification.

This invention relates particularly to machines for registering and recording fares taken on street-car, ferry, or other lines, its general object being to provide a machine of this class which shall afford greater security against fraud than those heretofore in use, and which shall at the same time be simple, compact, and reliable.

A brief description of the system upon which my fare-register is based and the leading features which are secured by it will first be given in order that the detailed description hereinafter given may be more readily understood.

In the registration of fares upon street-cars it is customary to employ a machine to be operated by the conductor which indicates upon its face the number of fares "rung up" during a single half-trip. At the end of each half-trip the number shown upon the dial of the register is transcribed by the conductor onto his day-card, and the dials are then reset to their zero position preparatory to indicating the fares taken upon the succeeding trip. As a partial check upon the reports of the conductor this trip-register has sometimes combined with it a so-called "totalizing-register," the dials of which are advanced one unit for each fare rung up. This totalizer is not set back to zero with the trip-dials, but goes on continuously and indicates the number of fares rung up through the entire day or during any stated or desired period which may elapse between its examinations by the inspectors of the company. When so examined, the number shown upon the dials of the totalizer is transcribed into the inspector's report-book, and when, often with considerable difficulty, it is compared with the day-cards of the several conductors who may have used that register during the corresponding period it verifies or perhaps more usually belies those day-cards. The question then becomes one of veracity or of accuracy between the conductors and the inspector, and as all are peculiarly liable to error in the transcribing of figures and as the dials from which the figures were transcribed have since most certainly been changed, it is utterly impossible to review their work. Thus it will be seen that a comparison of the figures returned by the inspector and by the conductors affords no proof of their correctness. When they agree, they may be said to afford presumptive proof of their own correctness, but when they disagree the presumption of error or of fraud is by no means conclusive as against the conductors, inasmuch as the inspector may have erred in transcribing the figures. Even if the inspector's report is assumed to be correct no proof, either conclusive or presumptive, is thereby afforded as to which conductor is responsible for the error or fraud, as the case may be. Even though the rules may require each conductor upon assuming charge of a car to certify upon his predecessor's day-card to the reading of the register at that time, there remains the easy possibility of collusion between the conductors and even with the inspectors. Such a system of checks, if elaborate enough to be thorough, is burdensome alike to the conductors and to the receiving-office and is expensive and unsatisfactory to the company.

The particular object of my invention is to provide a fare-register which shall produce by positive mechanical means a permanent and unalterable record, inaccessible to the conductor, of the fares indicated on the trip-dials at the end of each trip or half-trip, the successive records of the day to be made in their consecutive order upon a slip of paper which may be removed each day, and which shows upon its face in plain figures a consecutive record of the trips for that day, the direction of each, and the number of the car on which the record was taken.

In connection with the above I provide means for positively interlocking the mechanism, so that the trip-dials cannot be reset to zero without first recording the last and highest number indicated by them, and so that the register cannot be otherwise dishonestly manipulated. I also incase the mechanism, so as to avoid the necessity of making any slots in the casing or sound-holes for the bell, which would also admit dust.

Another advantage secured by my arrangement herein shown is that the registers are securely attached to the cars, yet arranged so that they can be readily removed from one car to another without the use of tools of any kind and without unhooking or disturbing the cord connection.

These leading considerations and many others hardly less important are fully met in the machine of the present invention.

Reference is made to the accompanying drawings, in which—

Figure 2:
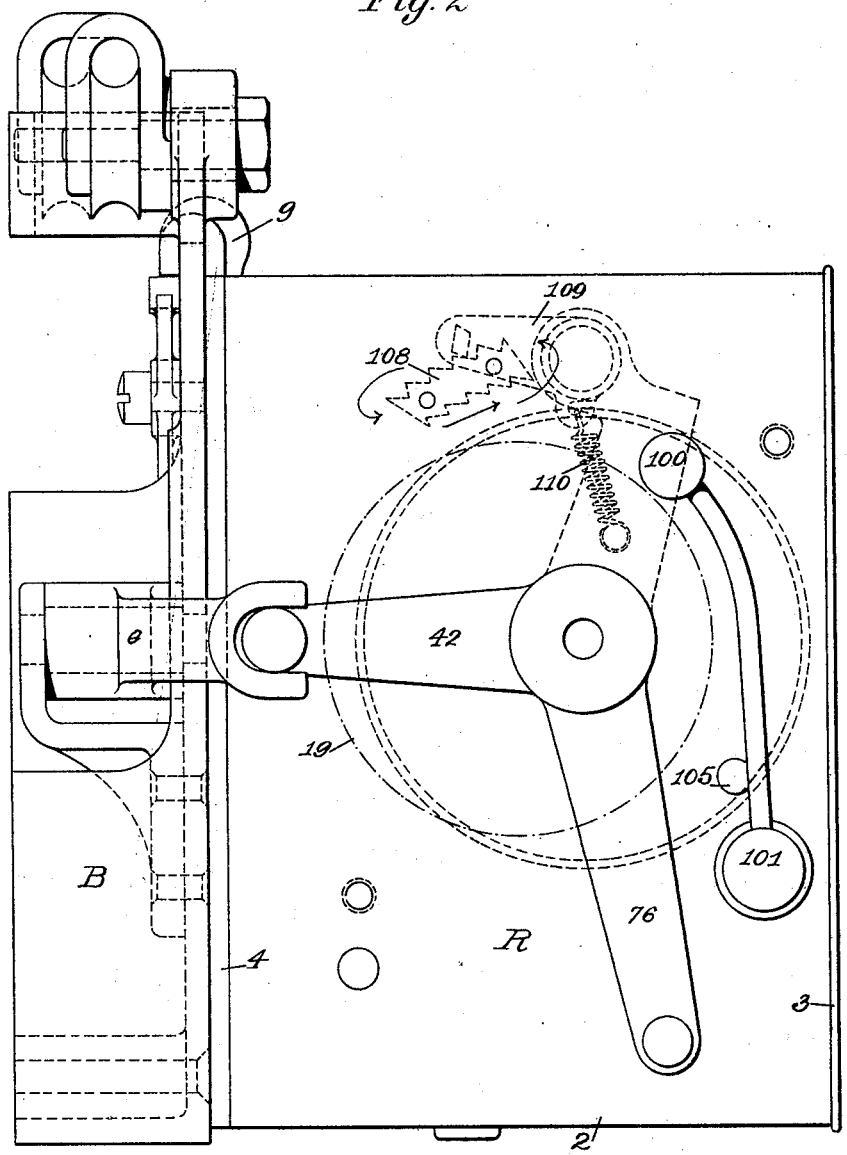
Figure 3:
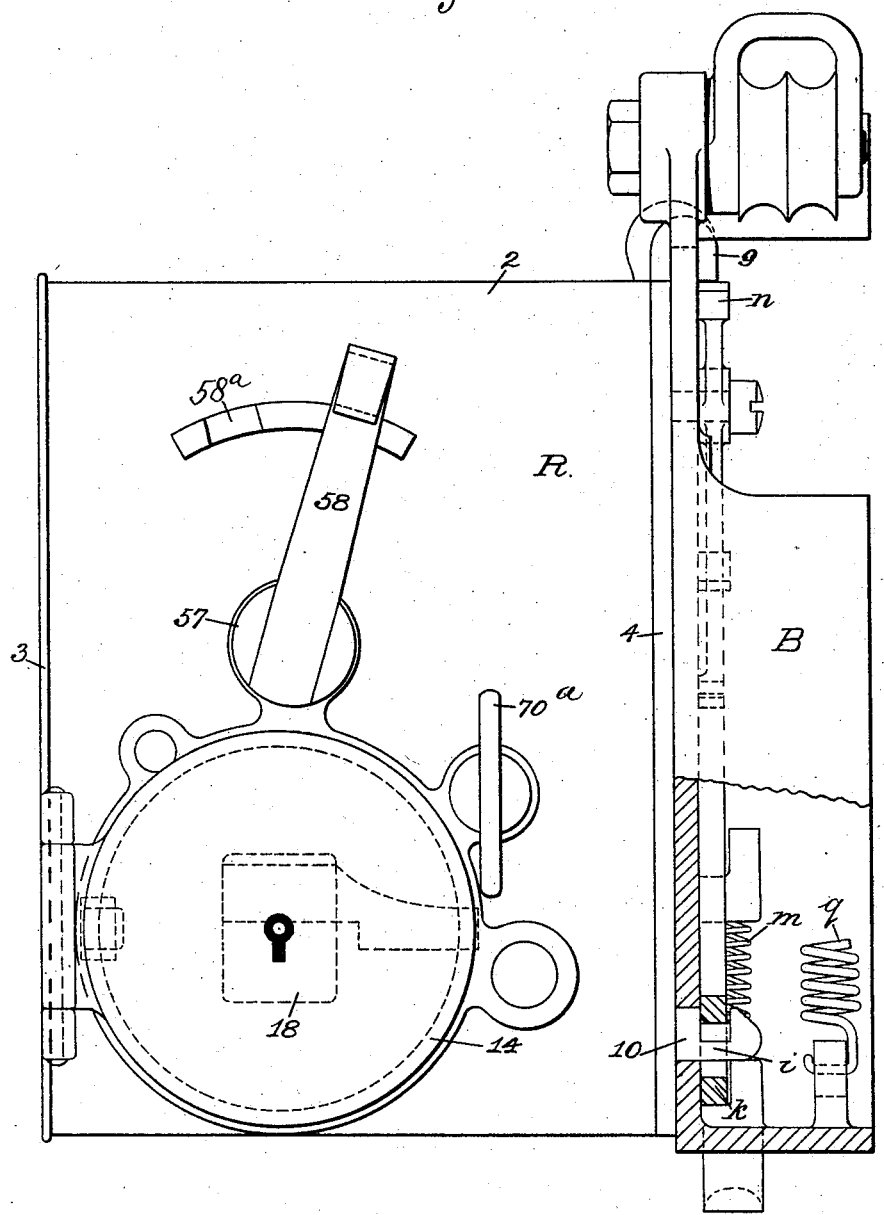
Figure 4:
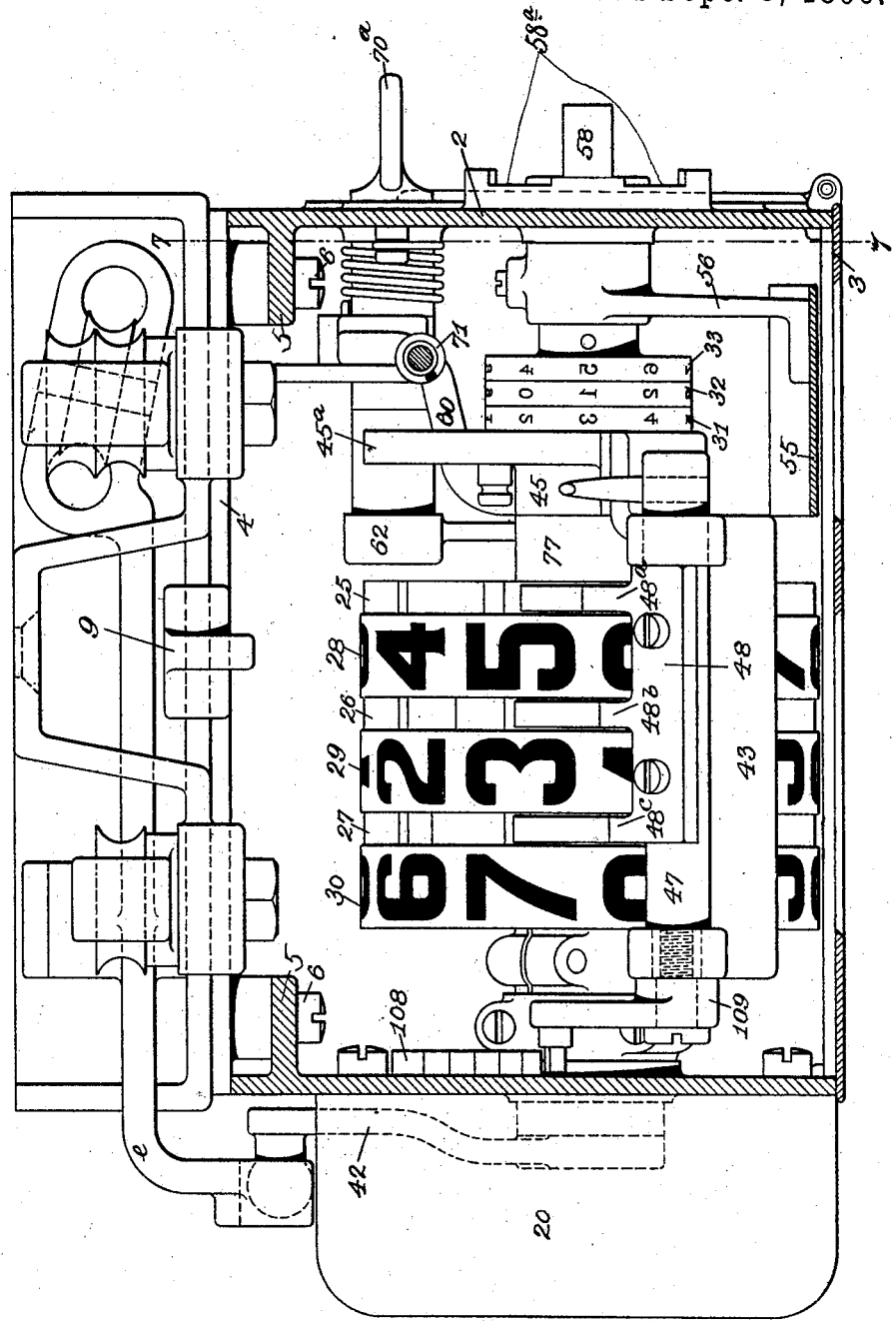
Figure 5:
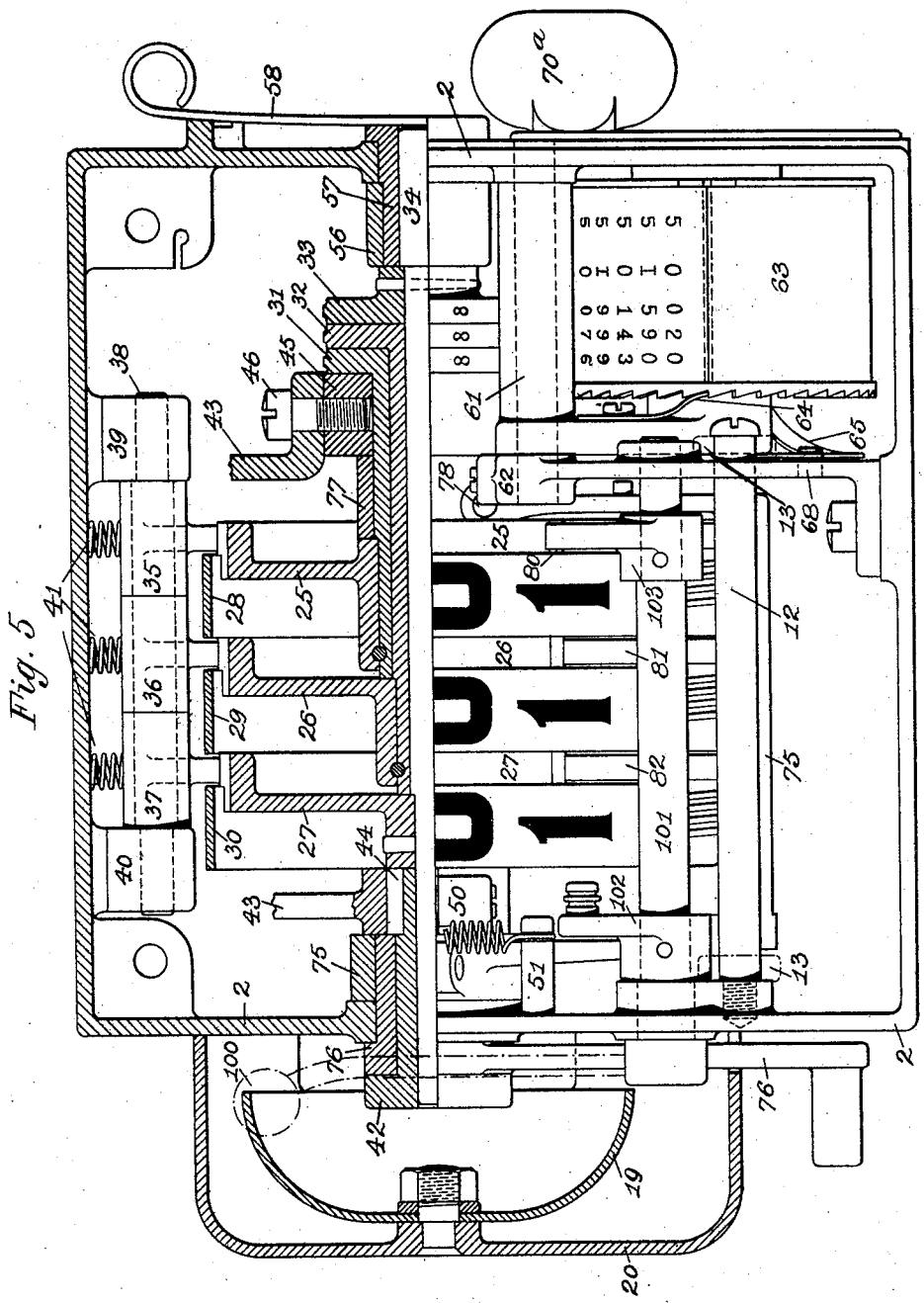
Figure 6:
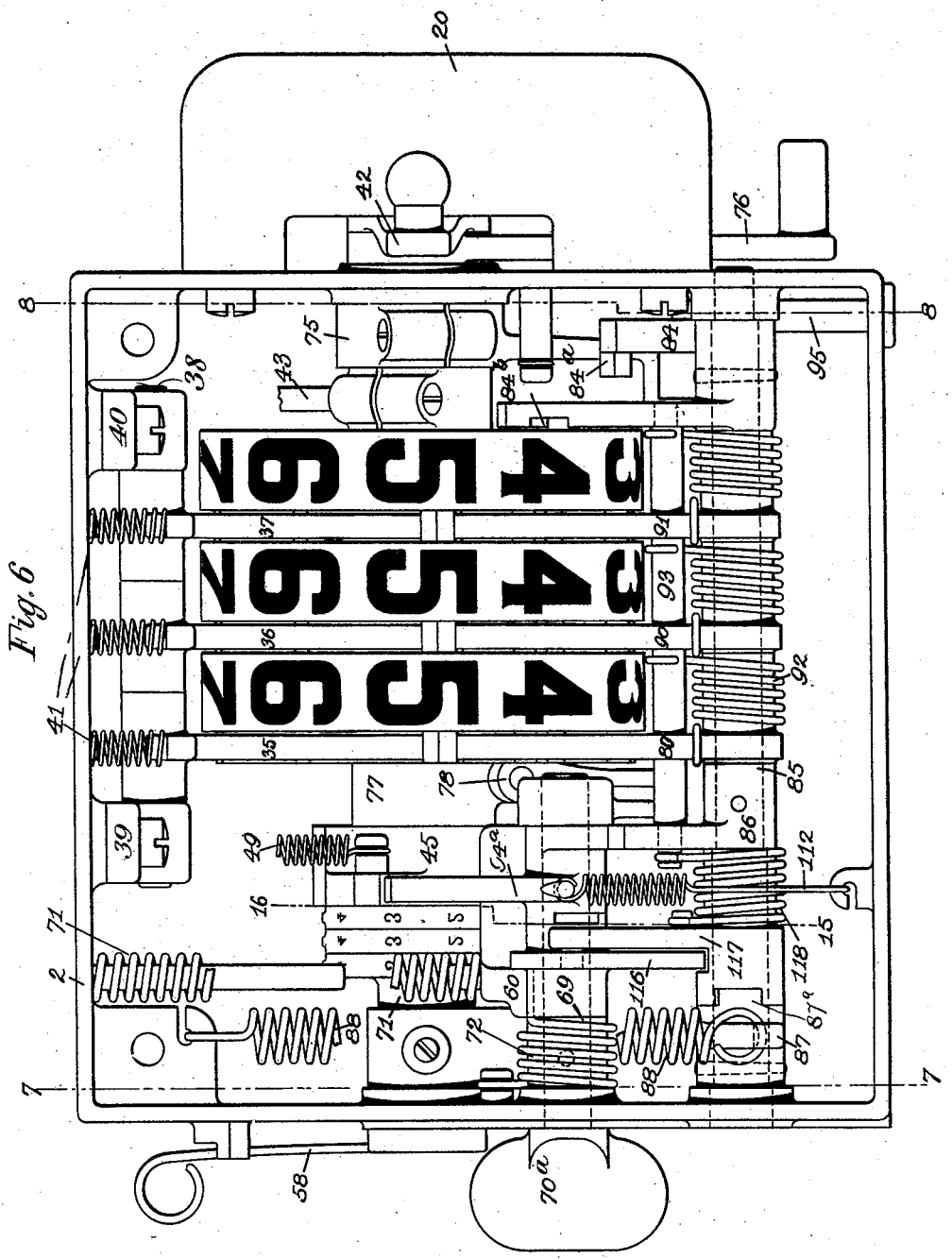
Figures 7, 17:
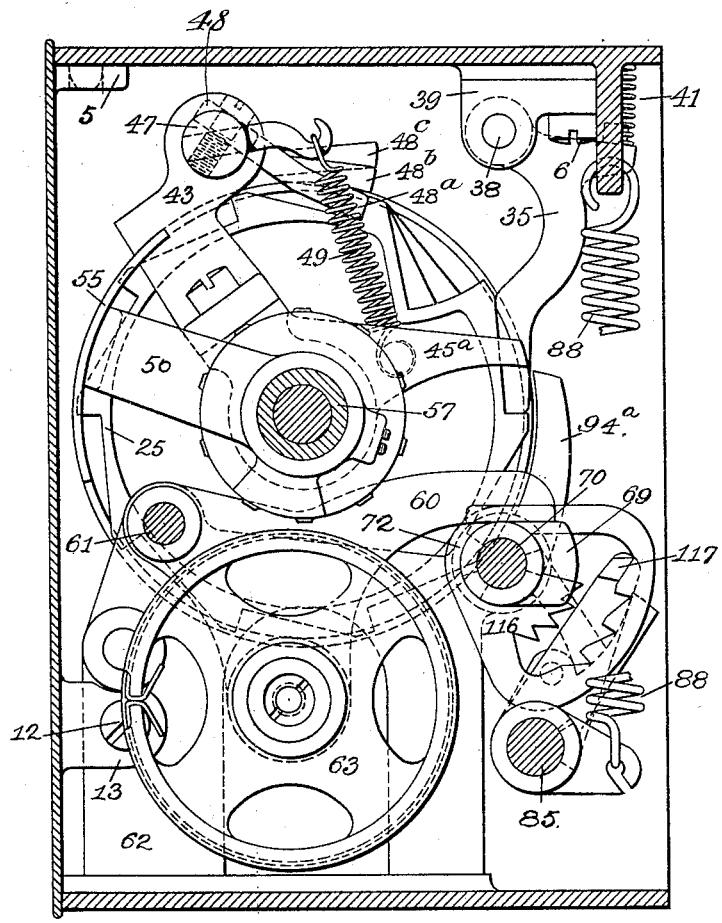
Figure 8:
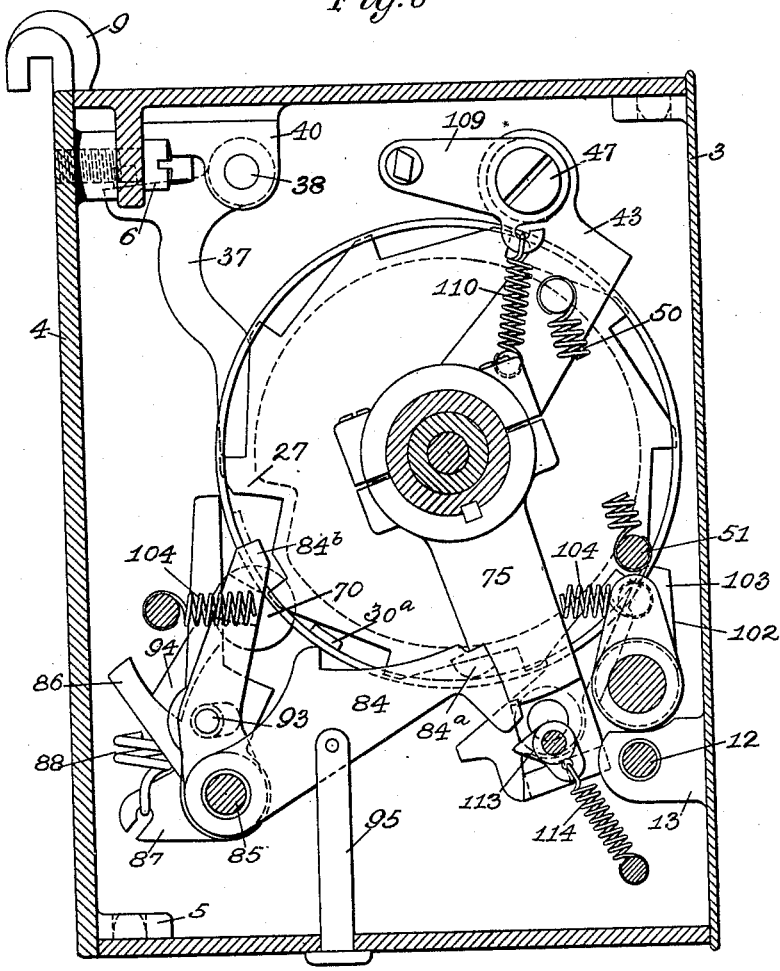
Figure 18:
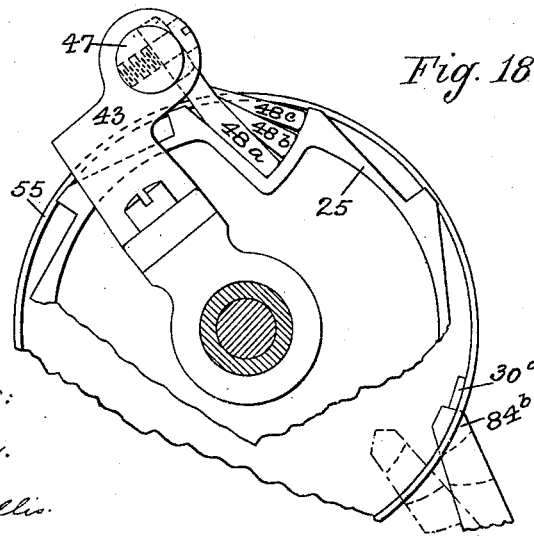
Figure 9:
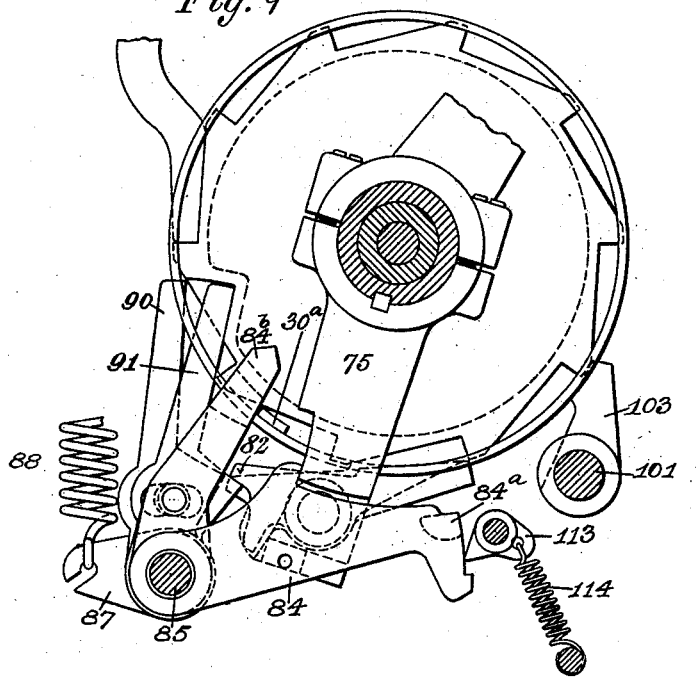
Figure 10:
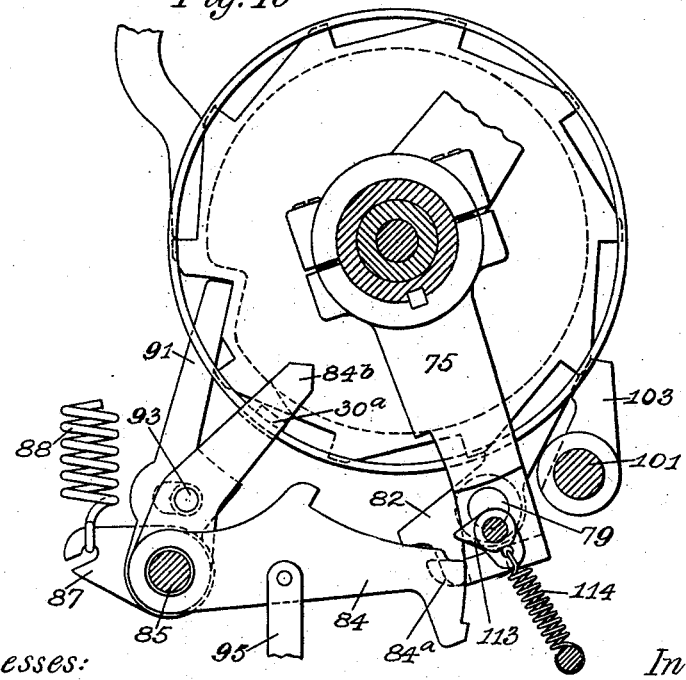
Figure 11:
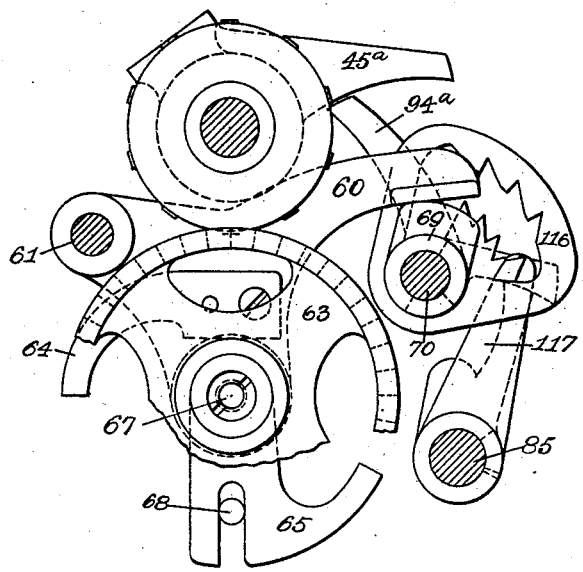
Figure 12:
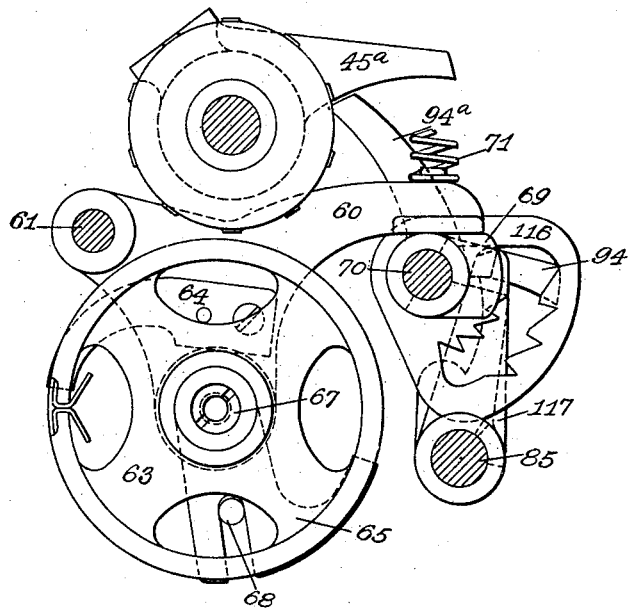
Figure 13:
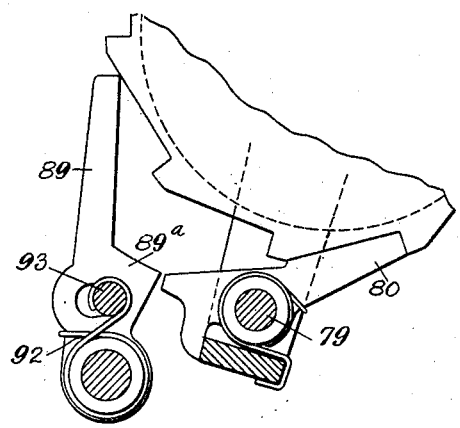
Figure 14:
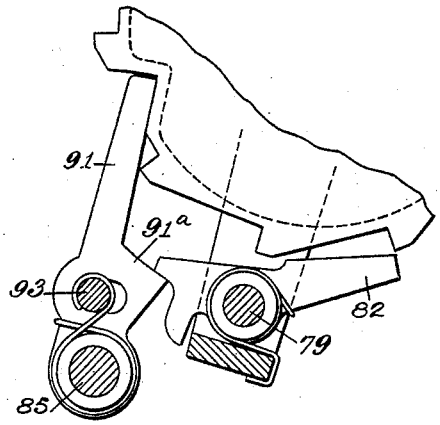
Figure 15:
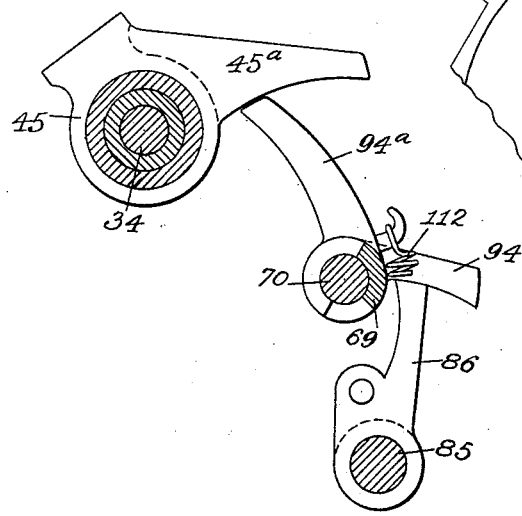
Figure 16:
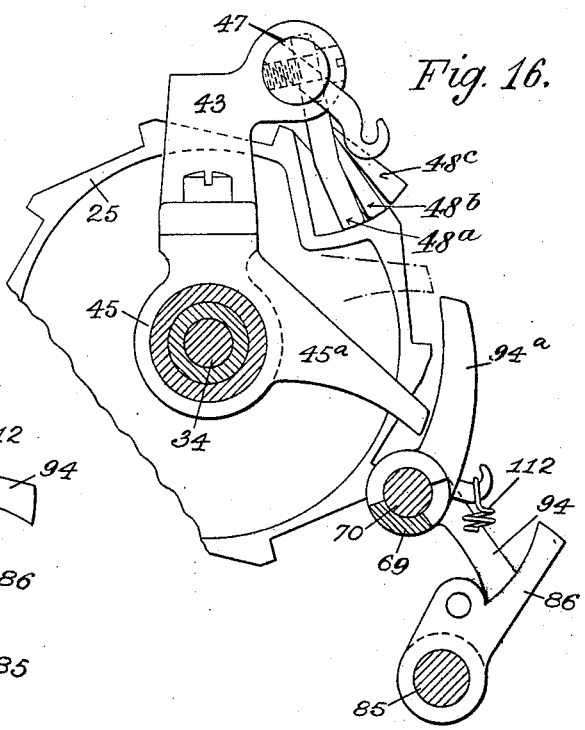

Figure 1 represents a front view of my improved register and its base with its lower portion of the front cover broken away so as to show some of the interior mechanism, that part which supports and rotates the record-drum being shown in cross-section, taken on the center line thereof. Fig. 2 is a view looking from the left-hand side of Fig. 1 with the bell and its case removed in order to show the registering and resetting levers more clearly. Fig. 3 is a view of the right-hand side of the machine and its base, showing the door closed and the direction-setting arm in its backward position. The lower portion of the base is here drawn in cross-section on the line 3 3 of Fig. 19, showing the means for latching the register to its base. Fig. 4 is a plan view of the register and its base, the upper wall of the register-case being broken away in order to show its interior more clearly. Fig. 5 is a front view of the register with its front plate removed and showing the upper half of the machine in section, taken on a vertical line through the central shaft thereof. Fig. 6 is a rear view of the machine with its base and back plate removed. The dials are here shown as they appear from the back when set to zero ready to commence a new trip. Fig. 7 is a sectional view taken on the line 7 7 of Fig. 6, looking from the left-hand side thereof, with the parts in the position occupied by them as shown in Fig. 6. Fig. 8 is a cross-sectional view taken on the line 8 8 of Fig. 6, looking from the right-hand side thereof. The section, however, extends through the back plate, which is here shown in position. The other parts are in the position occupied by them in Fig. 6. Fig. 9 is an end view similar to that shown in Fig. 8 of the dials and of the mechanism employed for resetting them to zero, the resetting-arm being here shown in its backward position. The hundreds-dial is here shown to be in its zero position, as in Fig. 8, but one or more of the dials beyond it have not yet been brought to zero, as is indicated by the position of the locking-arm and one of the farther stop-pawls. Fig. 10 is a view of the parts shown in Fig. 9 in the position occupied by them when all of the dials have been reset to zero and with the resetting-arm locked in its forward position by the locking-arm, the latter in its downward position. Fig. 11 is a view of the recording mechanism in a position succeeding that of Fig. 7, showing the recording-drum pressed into engagement with the type-wheels and showing also the registering mechanism locked against movement. Fig. 12 is a similar view of the parts shown in Fig. 11 at a later stage in their operation, showing the recording-drum dropped away from the type-wheels. The registering-arm is here shown to be still locked against operation. Fig. 13 is a view of a portion of a ratchet-wheel and its resetting mechanism, showing how the resetting-pawl is allowed to engage with a wheel which is not yet at zero. Fig. 14 is a similar view showing how the resetting-pawl is prevented from engaging with a wheel which is already at zero. Figs. 15 and 16 are sectional views taken on the line 15 16 of Fig. 6, showing the interlocking and latching mechanisms in two of their principal positions. Fig. 17 is a plan view representing a strip of soft paper such as is preferably used to receive the impressions of the type-wheels. Fig. 18 is an end view in cross-section, taken on the line 15 16 of Fig. 6, showing the ratchets and their registering-pawl in the position occupied by them when the three ratchets are advanced together and showing also the arrangement for locking the hundreds-dial so that it cannot make more than one complete rotation, for the reasons hereinafter set forth. Fig. 19 is a rear view of the base of the fare-register, showing the arrangement of the cord and its lever and showing also the interlocking mechanism for the parts which secure the register to the base.

The complete machine consists of two principal parts, designated in a general way as the "register" R and its "base" B. The latter is adapted to be permanently attached to any convenient panel of the car, the register being removably attached to the base. The latter consists, preferably, of a flanged casting, as shown in Fig. 19, provided with suitable screw-holes for attaching it to the car. Upon the base at $c$ is pivoted the cord-lever by means of the bracket $b$. The form of that lever is best shown in Figs. 4 and 19. It has a bent forked end adapted to engage the lever 42 of the register, and the opposite end of the lever is provided with a sheave, around which the operating-cord $r$ of the register is passed.

The lever $e$ is capable of oscillatory movement upon its pivot $c$ to the extent represented by the dot-and-dash center lines $e'$ $e^2$ in Fig. 19, that extent being regulated by the stops $e^3$ and $e^4$, respectively. It is pressed toward the lower stop $e^4$ by means of the spring $q$, attached between the lever $e$ and the base B. This extent of movement of the lever $e$ communicated to the lever 42 is sufficient to operate the register once at each oscillation of the lever. The lever $e$ is actuated by pulling either end of its cord $r$ to an extent equal to twice the distance traversed by the sheave on the lever. Thus it is necessary for the conductor to give a long pull upon the cord at each actuation of the register, and by reason of the length of the pull he is prevented from operating it in such quick succession as to prevent the separate actuations from being readily distinguished and counted. It is obviously necessary that the ends of the cord be secured to the car, as is the usual custom, or that stops be used at convenient places on the cord. Otherwise it would be drawn through without operating the register. If both ends of the cord are not required for use upon the two sides or ends of the car, the unused end may be short and may be made fast to the base itself, it being only necessary to have a free loop of cord to engage the sheave of the cord-lever, as shown in Fig. 19. This arrangement of the cord is applicable also to all cord-actuated registers, whether applied upon an oscillating arm, as herein shown, or upon a slide.

The cord-guides $g$ and $g'$ are secured to suitable bosses on the upper part of the base, the guide $g$ being provided with a single sheave and the guide $g'$ with two sheaves. Looking from the back of the base, as shown in Fig. 19, the operating-cord $r$ is passed from the right through the guide $g$ across and over the farther sheave of the guide $g'$, thence around the sheave in the cord-lever and back over the nearer sheave of the guide $g'$, passing thence to the left over convenient fair-leaders located at suitable intervals through the car. The opposite end of the cord $r$ is similarly carried through to the front platform or down the opposite side of the car, thus adapting the register to be operated from either side.

The register is preferably attached to its base at three points by means of the hook 9, which hooks over the top of the base at $h$, and by the studs 10 and 11, which pass through the holes $i$ and $j$. These are securely held from being withdrawn by means of the latch $k$, which drops into suitable notches made in the studs 10 and 11, which thereby serve as catches, as best shown in Figs. 3 and 19. The latch is normally pressed downward by its spring $m$, as shown in Fig. 19, and as the studs 10 and 11 enter the holes $i$ and $j$ the beveled ends of the studs in passing through the corresponding holes in the latch $k$ raise that latch, so that its holes coincide with the holes $i$ and $j$, thereby permitting the studs to pass through. Then the spring $m$, which has been compressed by the raising of the latch, forces that latch down again into the notches of the studs, as shown in Fig. 3. The lower end of the latch passes through a hole in the bottom flange of the case and is slotted to receive a padlock, (not shown,) which when in place thus serves to lock the register to its base. To remove the register from its base, it is necessary to push the latch upward, so that its holes again coincide with the holes $i$ and $j$, when the studs may be withdrawn. As it otherwise might sometimes happen in attaching the register that the studs 10 and 11 might be pushed through the holes $i$ and $j$ without first passing the hook over the top at $h$, and thereby insecurely attaching the register to its base, it is provided that the latch remains locked, so as to prevent the entrance of the studs 10 and 11, excepting when the hook is properly in position. This is accomplished by means of the lock $n$, which is pivoted to the base at $b'$ and is normally pressed inwardly against the stop $o$ by the spring $p$. It will be seen that the latch $k$ cannot be raised until the lock $n$ has been pressed to its position represented by the dot-and-dash lines by the proper insertion of the hook 9.

The register, which is indicated in a general way by the letter R, is contained within the case 2, preferably cast in a single piece of metal, provided with the front plate 3 and the back plate 4. The latter is secured to the case by means of lugs 5 and screws 6. (Best shown in Figs. 4 and 8.) The back plate is also provided with a hook 9 and engaging pieces 10 and 11, by means of which the register is removably attached to the base B, as previously described. The front plate 3 is secured to the case by means of lugs similar to that of 5 and by means of a bolt 12, which passes through suitable lugs 13 of the front plate, through the bracket 62, and is threaded into the case, as best shown in Figs. 5 and 7. The screws 6 are inaccessible from the outside of the case, and the bolt 12 can only be reached through an opening in the case, which is closed by the door 14. (Best shown in Figs. 1 and 3.) That door is herein shown to be secured to the case by means of hinges and by a lock 18, so that the interior of the register is inaccessible to all excepting those in possession of a proper key. The front plate 3 is provided with suitable glazed openings, (shown in Figs. 1 and 4,) so arranged as to show in a horizontal line those figures of the three dials which appear at the front in the horizontal plane of the centers thereof. The figures which are thus visible are herein described as being in their "indicating position."

Upon the left-hand side of the register is attached a case 20, containing a bell 19. (Best shown in Fig. 5.) This bell is fixed in suitable relation to the bell-hammer 100, as indicated by dot-and-dash circle in Fig. 2. The bell-case 20 serves to support, cover, and protect the bell, and is provided with a slot at its lower side, through which projects the resetting-lever 76.

In the organization of this machine the interrelation of the parts is such that it is hardly practicable to attempt a strictly consecutive description thereof in the order in which the several operations are performed, for in the description of one group of the mechanism it often happens that reference must be made to other groups not then yet described, in which case the reader is referred to the paragraph in which that mechanism is described. The division herein assumed of the machine into separate groups is to a large extent arbitrary, since many of the combinations set forth and claimed are comprised in more than one group of mechanism, as these groups are herein divided. This being understood a description will now be given of each of these arbitrarily-grouped mechanisms, beginning with

*The registering mechanism.*—This consists of three ratchet-wheels 25, 26, and 27. These are arranged side by side, encircling the shaft 34 and have attached to them the dials 28, 29, and 30, respectively, each of which has upon its periphery the numerals "0" to "9," inclusive, and these three dials when read at their indicating position, as seen through the glazed opening in the front plate, serve to indicate units, tens, and hundreds. Referring to Fig. 5, the units ratchet-wheel 25 is fixed upon an extension of the type-wheel 31, and the tens-ratchet 26 is fixed upon a similar extension of the type-wheel 32. The hundreds-ratchet 27 is fixed upon the shaft 34, to which the hundreds type-wheel 33 is also fixed. These three sets of ratchets and their attached type-wheels are arranged to turn freely one within the other and are controlled by suitable pawls and detents operating upon the teeth on the outside of the ratchets. The detent-pawls 35, 36, and 37 are loosely mounted side by side upon the rod 38, the ends of which are secured to the top of the case by means of the brackets 39 and 40. These pawls (best shown in Figs. 5, 6, and 8) are adapted to engage with the ratchets 25, 26, and 27, respectively, and to hold them in the position to which they are carried by either of the two sets of operating-pawls. Each detent is pressed into contact with its respective ratchet by means of the spring 41, as best shown in Figs. 6 and 7. Each of these ratchets is provided with ten teeth equally spaced upon its circumference and adapted to be engaged by the several pawls and detents. Between two adjacent teeth on the units and tens ratchets the notches are made deeper than the rest, that of the tens-ratchet being twice and that of the units-ratchet three times the ordinary depth. The object of these special notches will be explained in connection with the description of the pawl 48. Each of these deep notches is so located circumferentially with relation to its dial as to be in position to be engaged by its member of the pawl 48, as shown in Fig. 18, when the numeral "9" upon the dial stands at its indicating position. Each ratchet is also provided with a notch adapted to be engaged by its stop-pawl, as 91, (shown in Figs. 10 and 14,) when the dials show zero at the indicating position.

The oscillations of the cord-lever $e$ are communicated to the registering-lever 42, as best shown in Figs. 2 and 4, the forked end of the cord-lever engaging the ball-shaped end of the lever 42, so as to allow of their respective movements due to the relative positions of their axes.

Referring now to Fig. 5, the lever 42 is shown to have a hub which extends through to the inside of the case and has clamped upon it the registering-arm 43. A spline 44 is preferably employed to insure positiveness of connection between the lever and the arm. In the view shown in Fig. 5 that upper portion of the arm 43 which arches over and across the face of the dials is broken away for convenience in showing other parts of the mechanism. In this view, however, is shown the manner of securing the opposite end of the arm, which is attached to the sleeve 45 by means of the screw 46. The sleeve 45 turns freely upon a cylindrical shell of the type-wheel 31, and the object in thus attaching the arm 43 to the sleeve is to insure rigidity of the arm 43 and greater steadiness in its motion, which is a vibratory one, having the axis of the shaft 34 as a center. The remainder of the arm 43 is best seen in Figs. 4, 7, and 8, wherein it is shown to be provided with hubs, in which are journaled the ends of the pawl-shaft 47. That shaft has fixed upon it the pawl 48, the form of which is best shown in Figs. 4 and 7. It is preferably made with three members in an integral piece, those members being arranged opposite to and adapted to engage with the ratchets 25, 26, and 27, respectively, as best shown in Figs. 7, 16, and 18. The pawl 48 is pressed into engagement with the ratchets by means of a spring 49, attached between a pin on the sleeve-arm $45^a$ and a stud fixed to the pawl-shaft 47. The member $48^a$ of the pawl is adapted to engage with the units-ratchet 25, which, as shown in Figs. 7 and 18 and as hereinafter described, is provided with a deeply-cut recess adjacent to one of its teeth, one edge of the recess forming the face of the tooth. The member $48^b$ of the pawl 48 is adapted to engage with the tens-ratchet 26, which is provided with a recess similar to that of ratchet 25 just described, but not quite as deep. When the ratchets are in the position shown in Fig. 18, the member $48^c$ of the pawl is allowed to engage with the hundreds-ratchet 27. The differing recesses of the two ratchets are so disposed that they are in line when similar numbers on their two dials are also in line, as in Figs. 5 and 6, and their object is to allow of a suitable selection of the ratchets by the pawl 48, enabling it to advance the tens-ratchet at each tenth impulse of the units-ratchet, and enabling it also to advance the hundreds-ratchet at each tenth impulse of the tens-ratchet. The sleeve 45 is provided with a curved arm $45^a$, which serves to carry a stud for the spring 49 and also serves as a means of locking the registering mechanism against movement during the operation of recording, as will be hereinafter described.

The extent of the vibratory motion imparted to the arm 43 by means of its lever 42 and the cord-lever *e* is equal to a little more than the thirty-six degrees angular separation of the teeth of the ratchet-wheels in order to enable it to advance the ratchet one tooth at each of its vibrations.

Referring to Fig. 7, the ratchets are shown in the position they occupy when the dials indicate zero, as shown in Fig. 5, and the register-operating arm is shown in its position of rest with the member 48$^a$ of the pawl 48 resting in contact with that tooth of the ratchet next following the deep recess, the members 48$^b$ and 48$^c$ being, therefore, held out of engagement with their respective ratchets, so that as the register is operated the arm 43 is vibrated toward the left, carrying with it only the units-ratchet 25. The units-wheel is thus advanced one tooth at each oscillation of the registering-arm until the units-dial reaches the position where it shows the figure "9" upon its face. At the next stroke of the registering-arm it is necessary to advance both the units and the tens dials one step. At this time the deep space of the units-wheel comes beneath its member of the register-operating pawl, and that pawl is therefore permitted to drop deeper than before, so that it allows the member 48$^b$ to engage with the ratchet 26 of the tens-dial, thereby bringing both of the ratchets forward one step. The relative position of the pawl and the ratchets at the conclusion of the stroke just described is best shown in Fig. 16. The registering mechanism may thus be operated continuously, advancing the tens-dial one step at each complete rotation of the units-dial until both of those dials show the number "99" at the aperture in front. It is then necessary to advance all three dials one place, and as the deep notch of the tens-ratchet 26 is at this time underneath the pawl 48$^b$ that pawl will drop down to its lowest position, as shown in Fig. 18, thereby permitting all three of the pawls to engage their respective ratchets, moving them one step forward. It will be noted that the pawl 48 and its arm 43 are operated positively in the direction in which they move the dials, and that they are returned to their normal position of rest (shown in Fig. 8) by means of the spring 50, the fixed end of which is attached to a suitable stud 51 in the side of the case. The cord-lever spring *q* in the base also coöperates with the spring 50 in returning the registering-arm to its normal or non-operative position. It will be remembered that the detents 35, 36, and 37 engage with and prevent any return motion of their respective ratchets.

The type-wheels 31, 32, and 33 are positively connected with their ratchets 25, 26, and 27, respectively, by means of taper-pins, as best shown in the sectional portion of Fig. 5. These type-wheels therefore rest side by side and are provided with raised figures upon their peripheries corresponding to the numerals "0" to "9," arranged in the same consecutive order as the corresponding numbers which appear upon the faces of their respective dials and so arranged in relation thereto that the numerals which show at the indicating positions of the dials shall be represented by corresponding numbers upon their respective type-wheels at their point of contact with the record-drum, designated by me as the "recording-line."

*The direction-indicating mechanism.*—This is best shown in Figs. 1, 4, and 7 and consists of a sector-shaped dial 55, provided with any suitable words indicative of the directions of the trips, such as "Out" and "In" or "Up" and "Down." This dial is mounted upon an arm 56, which is provided on its lower side with a sector-shaped enlargement carried out to the circle of the type-wheels. The angular extent of this sector, as seen in Fig. 7, is sufficient to allow of two rows of type corresponding to the words "Out" and "In," and either of those words upon the type-wheel-carrying sector is brought into the recording-line when the corresponding word is shown upon the direction-dial 55 at the indicating-line. This dial may be set to either of its two positions by the means best seen in Figs. 3 and 5. The arm 56 is fixed upon the bushing 57, which is journaled in the case concentrically with the axial line of the dial-ratchets and their type-wheels, and forms a bearing for that end of the shaft. Upon the outside end of the bushing 57 is fastened the direction-lever 58. This lever is preferably made in the form of a flat spring, which extends upward and is provided with a turned-over portion adapted to be manipulated by the thumb and finger of the conductor. The lever is retained in either of its two indicating positions by means of notches in the outside of the case, (best shown in Figs. 3 and 4,) the spring of the lever being so set as to urge it toward the case.

*The recording mechanism.*—This is best shown in Figs. 1, 5, 7, and 12 and consists of the arm 60, pivotally mounted upon the rod 61, one end of which is supported by the bracket 62 and the other end by the case 2, as best seen in Fig. 5. A projecting hub 60$^a$ on the arm 60 is adapted to receive the drum 63, as best shown in Fig. 1, and this drum is adapted to support upon its external periphery a strip of paper, such as shown in Fig. 17, the ends of which are tucked through a cross-slot in the periphery of the drum, as seen in Fig. 12. Flanges are provided upon the edges of the drum to keep the paper strip from slipping sidewise thereon. The inner or left-hand edge of the drum, as seen in Figs. 1 and 5, is provided with radial notches, with which a detent-pawl 64 and an actuating-pawl 65 are adapted to engage. The pawl 65 is provided with a stem 66, which is pivotally mounted in the arm 60 concentrically with the bearing of the drum 63, being secured therein by the nut 67. This pawl and the detent are best shown in Figs. 1, 11, and 12 and are made of spring material in order to allow movement into and out of the notches in the drum 63. A pin 68 is fixed in the side of the bracket 62 and engages in a slot in the pawl 65 for the purpose of retaining that pawl in the position relative to the arm 60 shown in Figs. 11 and 12, forming the supporting means for that pawl, whereby it is enabled to turn the drum upon its hub as that lever is moved back to the position shown in the latter figure. The arm 60 and its drum 63 are so mounted in relation to the type-wheels that the surface of the drum is brought into contact with them at their recording-line.

As shown in Figs. 11 and 12, the right-hand end of the arm 60 is adapted to rest upon and be operated by the cam 69, fixed upon the shaft 70. Fig. 11 shows the parts in the position occupied by them when the cam 69 is turned so as to carry the drum into contact with the type-wheels in the act of taking an impression therefrom. Fig. 12 shows the same parts in the position they occupy after the cam is turned back again, the record-drum being thus allowed to move away from the type-wheels. The drum 63 is normally held from rotating with relation to the arm 60 by means of the detent 64, fastened upon that arm and engaging with a tooth of the ratchet. As the arm is carried upward by its cam to the position shown in Fig. 11 the pawl 65, held back by its pin 68, slips over and engages with the succeeding tooth of the drum 63. As the arm drops back to the position shown in Fig. 12, the drum is therefore advanced one tooth by means of the pawl 65, the detent 64 meanwhile slipping over and engaging with its succeeding tooth. Under ordinary circumstances gravity will be sufficient to bring the recording-drum back to the position shown in Fig. 12; but it may, if desired, be assisted by means of a spring 71, the fixed end of which is attached to the case 2. The cam-shaft 70 is journaled in the case 2 and in the bracket 62 and is provided at its outside end with any convenient knob or thumb-piece 70ᵃ to enable it to be operated by the finger and thumb of the conductor. The spring 72 is coiled upon and secured to the cam 69, the other end of the spring being attached to a stud in the side of the case 2, and that spring is adapted to carry the cam and its shaft backward from the position shown in Fig. 11 to that of Fig. 12. Upon this shaft are also mounted interlocking appliances, the construction and purpose of which will be hereinafter described.

A suitably-projecting portion of the door is adapted when closed to form an end bearing for the drum, so as to hold the latter into suitable engagement with its pawl and detent. As herein shown, (see Fig. 1,) this end bearing is formed by the case or frame of the lock 18, attached to the door 14. Thus when the door is open the drum is free to be removed through the doorway with which it is concentric when in its lowered or non-printing position. (Shown in Figs. 7 and 12.)

*The resetting mechanism*—This is best shown in Figs. 1, 5, 8, 9, and 10, and consists of an arm 75, somewhat similar in construction and appearance to the registering-arm 43, which is arranged on the opposite side of the dials from that arm. As seen in Fig. 5, its left-hand end is secured to a hub of the resetting-lever 76 against the face of the casing 2. The manner of attaching the arm to the hub of the lever is similar to that of the arm 43, by means of a spline and clamping-screws. The lever 76 is journaled in the casing 2 and projects downward upon the outside of the case, so as to be readily reached by the operator. The opposite end of the arm 75 is attached to the sleeve 77 by means of a pin 78, that sleeve being loosely mounted upon the hub of the type-wheel 31 by the side of the sleeve 45. The sleeve 77 is for the purpose of affording a firm pivotal support for its end of the arm 75. In suitable hubs of the arm 75 are fixed the ends of the rod 79, upon which are loosely mounted the pawls 80, 81, and 82, disposed opposite to and adapted to engage with the ratchet-wheels 25, 26, and 27, respectively. Each of the pawls is provided with a spring, as 83, coiled upon its hub, one end of which is adapted to engage with the working part of the pawl and the other with the cross member of the arm 75. The tendency of these springs is to hold the working faces of the pawls into contact with their respective ratchets. The arm 75 is capable of an oscillatory motion equal in angular extent to the separation of the teeth upon the ratchet-wheels, as shown by a comparison of Figs. 9 and 10, and its function is to reset the dials to their zero position after a record has been made of a completed half-trip. During the operations of registering, and until a certain stage in the operation of recording, the arm 75 is locked in the position shown in Fig. 8 by means of a projecting lug 84ᵃ on the side of the arm 84, which is fixed upon the shaft 85. That shaft has also fixed upon it the catch 86 and the spring-arm 87, to which is attached the spring 88, adapted to impel the locking-arm 84 downward, the other end of the spring being attached to a lug of the case, as shown in Figs. 6 and 7. Upon the shaft 85 are loosely mounted the stop-pawls 89, 90, and 91, located opposite to the ratchet-wheels 25, 26, and 27, respectively. These pawls are each provided with a spring, as 92, coiled upon its hub, with one end engaging with the rod 93 and the other engaging with its pawl and operating to carry it toward the dials to the position shown in Fig. 14. The rod 93 is fixed at its ends in the arms 84ᵇ and 86, and operates to limit the oscillatory motion of the stop-pawls upon the shaft 85, the amount of which is represented by the two positions of the stop-pawls shown in Figs. 13 and 14.

During the operation of the registering mechanism the appurtenances of the shaft 85 are held in the position shown in Figs. 8 and 16 by means of the catch 86, as above described. That catch is engaged by the latch 94, which is loosely mounted upon the shaft 70 by the side of the cam 69. Portions of the adjoining hubs of the cam and of the latch are cut away, so as to allow them to interlock, as best shown in Figs. 6, 15, and 16. The cross-hatched sector portion shown in the two latter views represents that part of the hub of the cam 69 which is adapted to engage with the hub of the latch 94. As that cam and its shaft are turned toward the left in the operation of recording, the hub of the cam engages with the hub of the latch 94 and serves to carry that latch from the position shown in Fig. 16 to that shown in Fig. 15, at which time it releases the catch 86, allowing the shaft 85 and its appurtenances to be carried by its spring 88 to the position shown in Fig. 9, in which position the further action of the spring 88 is resisted by the stop-pawls resting against ratchets of those dials which require to be reset to zero, as shown in Fig. 13. Those ratchets which are already at zero present their stop-notches to the pawls so that the latter drop into them, as shown in Fig. 14, being urged thereto by their respective springs.

When all of the dials are in their zero position, all of the stop-pawls will therefore fall into their respective stop-notches, which allows the spring 88 to carry the shaft 85 with its appurtenances to the position shown in Fig. 10. If no fares have been rung up on any particular trip, the record should be made as usual, when the shaft 85, upon being released from the latch 94, will at once be moved to the position shown in Fig. 10, as the dials are already in their zero positions and require no resetting. Under ordinary circumstances, however, some fares will have been rung up and one or more of the dials will require resetting to zero. In that case the shaft 85 and its appurtenances, when freed from the latch 84, will be moved to the position shown in Fig. 9, as before stated. In this position the lug 84ª on the side of the arm 84, which served to lock the resetting-arm 75 in the position shown in Fig. 8, now lies opposite to a recess in the side of the arm 75, allowing the latter to swing back to the position of Figs. 9, 13, and 14. Referring to the latter figures, it will be seen that the stop-pawls are provided with shoulders, as 89ª 91ª, which, when the pawls rest in the notches of the ratchets, are approximately concentric with those ratchets and are in position to engage with the heels of their respective resetting-pawls, so as to prevent them from dropping into the notch in the ratchet as the arm 75 is brought back to the position which would otherwise allow them to so engage. As the arm 75 is carried forward again from this position the heel of the pawl 82 does not escape from its engagement with the shoulder of the stop-pawl 91 until the point of the former pawl is carried safely beyond the engaging face of the ratchet-tooth, and so far as that ratchet is concerned the oscillatory motion of the arm 75 might be continued indefinitely without moving the ratchet. Those ratchets, however, which are not at their zero position hold their stop-pawls back in the position shown in Fig. 13, so that the pawl 80 drops into its notch behind the tooth before its heel encounters the shoulder of the stop-pawl 89, and the oscillatory motion of the arm 75 is continued until all of the ratchets are brought to their zero positions, when all of the stop-pawls will fall into their respective stop-notches in the ratchet-wheels, as in Fig. 14. In that case, however, the arm 75 cannot be brought to the position shown in that figure for the reason that the arm 84, which during the resetting operations had been sustained in the position shown in Fig. 9 by those stop-pawls which were engaged by ratchet-wheels not yet at zero, is now allowed to drop to the position shown in Fig. 10, in which position its lug 84ª has dropped below the plane of the recess in the side of the resetting-arm 75 and therefore engages with that arm again below the recess. A push-button 95 projects through from the outside of the case and is attached to the arm 84, by means of which that arm and its shaft are carried upward to the position shown in Fig. 8, where it is locked by means of the latch 94 engaging the catch 86. The angular extent to which this shaft is carried by the button 95, and in which it is locked by the latch 94, is sufficient to carry the stop-pawls 89, 90, and 91 entirely beyond the circle of the outside of the ratchet-teeth, so as not to interfere with their movement during the subsequent operations of registering.

*The alarm-bell mechanism.*—This is best shown in Figs. 2, 5, and 8. The bell 19 has already been referred to in the preliminary description. It is best shown in Fig. 5, being attached to its case 20 by means of a nut and washer. A bell-hammer 100, consisting of a spring yielding stem with an enlarged head, is transversely fixed in the end of the shaft 101, the ends of which are journaled in the case 2 and in the bracket 62, respectively. Fixed upon the shaft are the spring-arm 102 and the lifting-arm 103, the former being provided with a spring 104, the other end of which is attached to a stud on the inside of the case 2. The arm 103 is located opposite to the resetting-pawl 80 of the units-wheel and is adapted to be raised by that pawl as the latter is raised by the rotation of the units-ratchet in the operation of registering, and is allowed to drop again as the pawl 80 drops into each notch at the conclusion of the registering stroke, being forcibly returned by means of its spring 104. A stud 105 serves as a stop for the bell-hammer and is so located that the latter, when at rest, is just clear of the rim of the bell. When, however, the stem of the bell-hammer is brought forcibly against its stop 105, the spring of the bell-hammer stem allows the head to come in contact with the bell, thus sounding it in the usual manner. It will be seen that this connection of the bell with the units-ratchet is a very positive one, insuring that the alarm-bell shall be sounded simultaneously with each registration of a fare, and insuring also that neither the bell-sounding nor the registration can be effected without operating the other.

Although it is desirable that the bell shall be sounded positively at each actuation of the units-ratchet during the registering operations, it is equally desirable that the bell shall not be sounded when the units-ratchet is rotated in the operation of resetting it to zero. For this reason the lifting-arm is not allowed to connect directly with the ratchet, but is operated through the intervention of the resetting-pawl 80, and it is obvious that the pawl 80 can only serve as a connecting medium between the ratchet and the lifting-arm of the bell when it is in its forward position, (shown in Fig. 10,) in which position it is always locked during the operations of registering, as previously described. When in the operation of resetting that pawl is drawn backward and is raised by a tooth of the ratchet, as shown in Fig. 9, it is drawn entirely away from the lifting-arm, which, therefore, is not operated or affected in any way by the raising of the pawl 80 or by the subsequent partial rotation of the units ratchet-wheel. Thus the bell is positively connected with the units-ratchet during the registering operations and as positively disconnected therefrom during the resetting operations.

*The interlocking mechanisms.*—In connection with the above-described groups of mechanism it will be noticed that there are several elements to which no reference has been made for the reason that they play no part in the normal operation of the mechanisms in connection with which they were shown. Their function is to so interlock the various elements of the machine as to prevent the operation of those elements either in improper manner or in incorrect sequence. There are several of these interlocking devices in the machine, and they can best be described separately in connection with an indication of the respective derangements and errors which they are intended to prevent.

*Device for compelling a full stroke of the register-operating arm.*—This is generally desirable in all registering mechanism, but is particularly so in view of the adaptation of the present invention to infallibly record the figures indicated upon the dials at any given time. If, for example, it were possible to advance the register-operating arm 43 half-way in its stroke and then let it back to its resting position, (shown in Fig. 7,) the result would be that the type-wheels connected with the ratchets which were thus partially rotated would be turned part way also, so that their type would be on either side of the recording-line, and if an impression were taken at this time by the recording mechanism no impression would appear upon the slip to represent those type-wheels that were thus partially turned. This partial operation of the register-operating arm might result from accident or design, and in either case, if it were possible, would be objectionable. I obviate this possibility by means of the device best shown in Figs. 2, 4, and 8. Upon the inside of the case 2 is fastened a segment of an annular rack 108. This rack is provided with teeth upon its exterior and interior arcs, and those teeth are to be engaged by the outer and inner points, respectively, of the pawl 109. That pawl is loosely mounted upon the end of the shaft 47 and is adapted to admit of a vibratory motion upon that shaft to the extent necessary to enable it to engage upon both sides of the segmental rack 108. It is provided with a spring 110, the other end of which is attached to a stud in the side of the case, and that spring is so arranged that it tends to hold the pawl 109 in a position intermediate to its extreme positions, thus tending to hold the pawl into engagement with its segmental rack, whether that pawl is upon the inside or the outside thereof. In the forward or registering movement of the register-operating arm 43 the pawl 109 moves upon the outer teeth of the rack, as shown in Fig. 2, the form of those teeth and of that portion of the pawl which engages with them being such as to resist any backward movement of the arm 43 until it shall have been carried to the fullest extent of its motion, when the pawl 109 drops past the end of the rack and returns along the lower side of that rack. Thus the pawl can travel around the rack only in the direction of the arrows shown in Fig. 2, all motion in a contrary direction being resisted by the form of the teeth of the rack. Thus it will be seen that the registering motion once begun must be continued until the ratchet-wheel is carried to its next regular position corresponding to its notches, and that not until then can the register-operating arm return to its backward position, (shown in Figs. 7 and 15,) in which position only of the register-operating arm does it permit the operation of the recording mechanism. To this extent the mechanism just described coöperates with that to be described in the succeeding paragraph.

*Device for interlocking the registering and recording mechanisms.*—This device operates to prevent the taking of a record while the registering mechanism is in operation, and also prevents the operation of the registering mechanism while a record is being taken. The sleeve 45 of the register-operating arm is provided with an arm 45$^a$, the lower surface of which is curved to agree with an arc struck from the center of the cam-shaft 70 when the parts are in the position shown in Fig. 15, wherein the registering mechanism is locked in its forward position and the recording mechanism is free to operate. A member 94ª of the latch 94 is formed of a length suitable for engaging with the curved surface of the arm 45ª, and one side of the member 94ª is curved to agree with an arc struck from the center of the shaft 34 when the parts are in the position shown in Fig. 16, wherein the recording mechanism is latched out of engagement by the latch 94, leaving the registering mechanism free to operate. Thus the arm 45ª and the member 94ª are so adapted to each other that only one of them can be operated at a time. The latch 94 and its arm 94ª are preferably made of an integral piece provided with a hub which is mounted upon the shaft 70 and is connected with and operated by the cam 69, as previously described in connection with the resetting mechanism. A spring 112 (best shown in Fig. 6) is connected from any convenient part of the case to the back of the latch 94, and tends to hold the latter in the position shown in Fig. 16. In the position shown in this figure both the recording and resetting mechanisms are locked out of operation to allow of the operation of the registering mechanism which carries the arm 45ª from the full to the dot-and-dash positions shown in Fig. 16. In the latter position (shown also in full lines in Fig. 15) the registering mechanism is in the position which allows of the operation of the recording mechanism, the conclusion of which operates to release the latch 86, and consequently the resetting mechanism, as fully set forth in the description thereof.

*Device for interlocking the recording and resetting mechanism.*—This device operates to prevent any movement of the ratchet-wheels, and consequently of their type-wheels, while the recording-drum is being pressed into operation with those type-wheels for the purpose of obtaining a record therefrom. These dials and type-wheels can only be rotated from the outside of the case by means of the register-operating lever 42 and the resetting-lever 76. The means for preventing movement of the registering mechanism while a record is being made was described in the previous section, and the means for preventing movement of the resetting mechanism will here be described. The recording-arm 60 is provided with a projecting lug 60ª, (best shown in Fig. 1,) which is carried into the path of a lug 75ª on the resetting-arm 75 when the recording-arm is raised in the operation of receiving an impression from the type-wheels, and these lugs operate to prevent operation of either of their arms excepting when the other is in its normal position. It is therefore necessary that the recording-arm 60 shall be returned to its lowest position (shown in Figs. 7 and 12) before the engaging lugs 60ª and 75ª will permit of the operation of the resetting-arm, although that arm has been unlocked by the dropping of the lever 84 as a result of the unlatching of the catch 86 from the latch 94 at the conclusion of the forward stroke of the recording-cam shaft 70.

The principal reason for locking the registering and resetting mechanisms while a record is being made, and until the recording-drum shall have been moved entirely away from the type, is to prevent mutilation of the record and possible injury to the type. Without these safeguards it might be possible for the conductor or some other person, either accidentally or intentionally, to move the type-wheels while they were impressed in the paper upon the record-drum, thus tearing the paper and destroying that portion of the record.

*Device for interlocking the registering and resetting mechanisms.*—The necessity of locking the resetting mechanism against movement until all of the fares for a given trip have been registered and a record made thereof will already be understood. The necessity of preventing the possibility of again allowing the registering mechanism to be put in operation until all of the dials are fully reset to their zero positions is not equally apparent from the description so far given, inasmuch as the conductor could hardly serve any improper purpose by omitting to reset the dials to their zero positions, for the reason that he would be in that case the loser by just so many fares as were represented by the reading of the dials when he commenced another trip; but in order to prevent all possible incorrect manipulation of the machine I have provided the device described in this section, by means of which it is impossible for the resetting mechanism to be thrown out of operation or to a position which allows the registering mechanism to resume operation until all of the dials have been fully reset to zero.

The construction and relation of the parts involved in this function of the machine are best shown in Figs. 8, 9, and 10, and consist of a pawl 113, which is pivotally mounted upon a stud fixed in the side of the case and adjacent to the right-hand end of the lever 84. A spring 114 is so attached to the pawl 113 and to the case as to hold the former normally in the position shown in Figs. 8 and 10. As the arm 84 falls upon being released by the recording operation, as previously described, from the position shown in Fig. 8 to that shown in Fig. 9, its end engages with the pawl 113 and carries it to the position shown in Fig. 9, in which general position the arm 84 rests during the operation of resetting the dials, and it will be seen that any attempt to push the lever 84 up to the position shown in Fig. 8 would be opposed by the point of the pawl 113 engaging against the small step shown in the end of the lever 84. When all the dials have been reset to zero, the arm 84 drops to the position shown in Fig. 10, as previously described, releasing the pawl 113, so that it takes the normal position imparted by its spring. From this position of the lever 84 it will be seen that that lever may be carried upward and locked in its position shown in Fig. 8, because the point of the pawl being now free to turn upward will be so turned by the passage of the arm 84, thus allowing the latter to pass entirely by. In this connection it will be observed that the form of the upper portion of the arm 84 is so adapted to the sweep of the arm 75, as best shown in Fig. 9, that the former cannot be pushed to its upper position (shown in Fig. 8) excepting when the arm 75 is in the forward position shown in that figure. This is to prevent the possibility of pushing the arm 75 away from its forward position just at that time in the operation of pushing upward the arm 84 from the position shown in Fig. 10 when its lug 84ª is opposite to the recess in the arm 75, at which time that lug cannot, of course, oppose such a movement of the arm 75. Hence arises the necessity of the adaptation of the arm 84 just described, by virtue of which it cannot be pushed to its upper position until the resetting-arm is forward.

*Device for preventing repetition of record.*—The construction and mode of operation of this device can best be seen by reference to Figs. 6, 7, 11, and 12. The cam 69 is provided with a sector-ratchet 116 of peculiar construction, either attached thereto or made integral therewith. It is provided with a slot, the general position of which is concentric with the center of the cam 69, and the inner and outer edges of the slot are provided with teeth, which are adapted to engage with the double-pointed projection of a pawl 117. That pawl is loosely mounted upon the shaft 85 and is loosely interlocked by means of its hub with the hub of the spring-arm 87, as best shown in Fig. 6. The clutch-like interlocking portions of these two hubs allow of a vibratory motion of the pawl 117 upon the shaft 85 to an extent sufficient to carry the point of the pawl into and out of engagement with either one of the sets of teeth upon the ratchet 116. A spring 118 is coiled upon the hub of the pawl 117 and is so attached to the rod 93 as to impel that pawl toward the left, as viewed in Fig. 7, in which view the parts are shown in the positions they occupy preparatory to taking a record. As the cam 69 is turned toward the left in the operation of recording the sector-ratchet 116 is carried with it, and the pawl 117 rides over and engages with one after the other of the two notches of the ratchet 116, and thus operates to prevent any return motion of that ratchet until the cam shall have been carried to the completion of its stroke toward the left. At that time the shaft 85 is released from the restraint of the latch 94 and is carried toward the left to the position shown in Figs. 11 and 15 by means of its spring 88. This movement of the shaft 85 operates to carry the pawl 117 out of engagement with the outer teeth of the ratchet into engagement with the inner teeth, as shown in Fig. 11. It is now necessary to turn the cam 69 backward toward the right to the position shown in Fig. 12, the lower point of the pawl 117 riding over and engaging with one after the other of the inner row of teeth until, arriving at the position shown in Fig. 12, it is carried into a deep recess in the ratchet 116 and remains there while the resetting operation is being performed, at the conclusion of which, as hereinbefore described, the shaft 85 is carried from the position shown in Fig. 12 to that shown in Fig. 7. Thus it will be seen that the pawl 117 by its connection with the ratchet 116 operates to prevent backward movement or any repetition of the recording operation until the dials have been fully reset to their zero positions.

It will be noted that the spring 118 operates to press its pawl into contact with the outer teeth during the forward movement of the recording operation and until in the position shown in Fig. 11, when the spring 88 carries that pawl against the inner teeth of the ratchet and yields sufficiently to allow the pawl to pass over these teeth as the cam 69 is returned to the position shown in Fig. 12.

*Device for stopping the dials at their position which shows the highest number they are capable of indicating.*—Inasmuch as the continuation of the registering operation beyond the point where the dials indicate "999" would bring them all to zero again it will be seen that unless some device of this sort is provided it would be possible for a dishonest conductor after he had rung up a large number of fares, and if he chanced to be left alone with the instrument for a few minutes, to thus continue the registering operation to the zero position and then ring up and record a few fares just for the sake of appearances. He might then appropriate the amount represented by the difference between the number of fares thus shown and the number of fares actually taken. To prevent such manipulation of the register, I have provided the hundreds-dial with a projecting stop 30ª, (best shown in Figs. 9, 10, and 18,) into the path of which the end of the arm 84ᵇ projects when the parts are in their registering position, as shown in Fig. 18. That stop is so located with relation to the figures shown on the dial as to allow that dial to be turned as far as the position in which it indicates the number "9," when it is stopped against further movement, the other two dials being permitted to continue until they also each indicate "9." They cannot be carried beyond that position without carrying the hundreds-dial with them, and are therefore wholly blocked, as shown in Fig. 18. The only possible way in which the dials can then be reset to their zero position is by first operating the recording mechanism, which allows the arm 84ᵇ to drop to the dot-and-dash position of Fig. 18, in which position of that arm the dials may be reset to zero, as described in connection with the resetting mechanism. In the example of dishonest manipulation above referred to the necessary operation of the recording mechanism would print "999" upon the record-slip, and thus disclose to the company the fact that dishonesty had been attempted, unless the conductor's day-card and his returns agree with the record.

The mode of operation of this machine is as follows: A blank slip for the record having been placed upon the drum, that drum is placed in its position upon the arm 60, and the door is closed and locked by the inspector or other duly authorized official of the company. The machine is then in condition for the day's business. The conductor sets the direction-dial, by means of its knob, to its proper position, and for each fare collected he is supposed to actuate the mechanism once by means of its cord. The pulling of the cord operates to turn the cord-lever $e$ upon its axis $c$, and this motion is imparted to the registering-lever 42, which carries with it the registering-arm 43. The oscillations of the arm 43 operate, as hereinbefore described, through the medium of the three-part pawl 48, to turn the ratchet-wheels 25, 26, and 27 and their respective dials 28, 29, and 30, each actuation of the cord thus serving to impart to the units ratchet-wheel 25 one-tenth of a rotation. Each of these intermittent rotations of the units-ratchet operates through the medium of the resetting-pawl 80 to raise and release the lifting-arm 103 of the bell-hammer at each actuation of the cord, thus indicating by a stroke of the bell the completed registration of a fare. Arriving at the end of his trip, and before starting on the return trip, he is expected to reset the dials to their zero position. In order to do this, he must operate the printer-shaft 70 by means of its thumb-piece 70ᵃ as far as it will go and fully return it. He then moves the lever 76 back and forth until the dials are brought to zero, when the lever 76 is locked against further movement. It is not necessary for him to watch the dials at all, but merely operate the lever 76 until he finds it locked against further movement, which will at the most be at its ninth stroke. He must then push the button 95 up as far as it will go, and alter the indication of the direction-dial. This puts the machine in condition for his return-trip, at the end of which the same operations are repeated. At the close of the day, or at any regular period, the inspector opens the door, takes out the drum 63, and removes the impressed slip therefrom, substitutes a blank slip for the next day's record, replaces it, and locks the door, as before. The record, along with those taken on the other machines for that day, are sent to the office, where they serve to verify the day-cards of the conductors by whom they were respectively made, after which, being very small and occupying but little storage-space, they may be filed away for as long a time as may be found advisable, remaining, however, so long as they may be preserved, an indisputable, accurate, and detailed account of the operation of the machine for that day.

A representation is given in Fig. 17 of a record-slip having a supposititious day's record thereon. It indicates that thirty-four half-trips were made on that day by car No. 5, or register No. 5, as the case may be. Each horizontal row indicates the record of the half-trip, the repeated "5" in the first column being the number of the car or register. In the second column the letters "O" or "I" indicate the direction of the trip, whether "out" or "in," respectively, while the figures in the third column show the number of fares recorded on the respective trips. The date at the bottom of the slip may be written or stamped thereon before placing it in the machine or after removing it therefrom.

It is obvious that an inked ribbon may be employed in connection with this recording-drum, if desired, so as to give a type-written impression of the record, which, of course, may be manifolded by means of carbon-sheets in the way usual in connection with type-writing machines. Such a record is, however, more easily erased or altered, and is not by me considered to be as reliable as a record that is impressed or stamped into the paper.

The directions of the various trips may be indicated upon the record without the use of the middle column shown in Fig. 17 by the use of two styles of impressing-type for the column which indicates the number of the register. For instance, the number "5" in the first column of the example shown in Fig. 17 may be impressed by an upright style of type for the out trips and by an Italic style of type for the in trips; or the type which stand in the recording-line when "In" is shown at the indicating position may be turned on their sides, and thus indicate by their turned position upon the record the direction of the trip.

The openings in the front plate 3 (shown in Fig. 1) are located immediately in front of the center of the dials, and the visible figures and numerals of the several dials are herein described as being in their indicating position when they are visible through these apertures, and those figures and numerals which are so situated as to be brought into line with the aperture in the front plate are by me designated as the "visible" characters in contradistinction to the corresponding characters formed in impressing-type, those type being at all times invisible in the sense that they are concealed from view by the casing of the machine. The type or record-impressing characters are so located in relation to their corresponding visible characters that the latter, when at their indicating position, are represented by corresponding impressing-type, located at what is termed by me the "recording position," which in the combination herein shown is immediately below the centers of the dials, as shown in Fig. 7, so as to be in position to impress upon the adjacent drum 63 the same characters that are visible at the apertures. Thus in the position represented in Fig. 1 the visible indication "068—out" is represented by corresponding type-characters at the recording position (also shown in that figure) in position to be pressed into contact with the paper upon the drum.

The pawls 48ª, 48ᵇ, and 48ᶜ, herein referred to as the "registering-pawls," are those which are actuated by the conductor through the medium of the cord in registering or indicating the fares taken by him, while the pawls 80, 81, and 82 employed in the operation of resetting the ratchets and their dials to their zero positions are termed by me the "resetting-pawls." Both of these sets of pawls are therefore used to actuate their respective ratchets, and are therefore herein referred to under the general designation of "actuating-pawls," and are thus distinguished from the detent-pawls 35, 36, and 37, the function of the latter pawls being to retain the ratchet-wheels and prevent backward movement thereof. In certain of the following claims the resetting-pawls 80, 81, and 82 are referred to under the more general designation of "actuating-pawls," inasmuch as the construction and arrangement sought to be covered in those claims are not dependent upon their use as resetting-pawls. As an example of this may be mentioned the arrangement whereby these parts are enabled to coact with their respective stop-pawls 89, 90, and 91, so that each actuating-pawl is held out of engagement with its ratchet as soon as that ratchet has been brought to its zero or other desired position. Inasmuch as this operation of the pawls is not dependent upon or limited to their employment as resetting-pawls I am justified in applying to them the more general term of "actuating-pawls."

The dials are herein shown to be separate members detachable from their respective ratchets, but they are so made only for convenience in manufacture. No other reasons exist for making them otherwise than integral.

Various mechanical equivalents may obviously be substituted for the devices herein shown and described and different forms or various applications of springs may be substituted for those shown without essentially altering the nature of the function or the practical operation of those parts in their relation to the general scheme of the machine. For example, a crank or eccentric might be employed in place of the cam 69, and if connected to the arm 60 by means of a connecting-rod it would operate to positively return that arm, as the shaft 70 is returned after the recording operation, and in that case the spring 71 might be omitted. Again, the resetting-pawls 80, 81, and 82 might be provided with cranked arms similar to those of the detents 35, 36, and 37, and in that case be operated by springs similar to those of the detents in place of the coiled springs 83.

Many similar modifications may be made in the various elements, or equivalent elements may be substituted, without departing from the essential spirit and intent of this invention.

I claim as my invention—

1. In a latching device, in combination a latch normally resting in its closed position, and a lock normally engaging with the latch so as to prevent the latter from being raised by its catch when the object to be attached is improperly presented.

2. A safety latching device, consisting of a catch, a latch therefor, and a locking-piece adapted to engage that latch and lock it in its latching position, the locking-piece being swung aside so as to allow the latch to be raised only by the proper presentation of the objects to be latched.

3. In combination with two objects to be latched together, the herein-described means for preventing that latching excepting when the objects are properly presented for engagement, one of those objects being provided with a catch, the other object being provided with a latch therefor, and with a lock engaging with and preventing the raising of the latch by its catch when the two objects are not properly presented for engagement.

4. In combination with two objects to be latched together, one of those objects being provided with a latch and with a lock normally holding the latch in its closed position, the other object being provided with a catch for engaging with the latch, and with means for engaging with the lock, whereby the latter is moved aside by the proper presentation of the two objects so as to allow the latch to raise and admit the catch, substantially as described.

5. In combination with a base, and with a fare-register provided with a suitable hook and with engaging lugs adapted to be removably attached to the base, the herein-described means of safely securing them together, consisting of a latch normally held in its closed position, adapted to be raised by the entrance of the lugs of the register, and adapted to drop into recesses in those lugs, a lock pivotally mounted upon the base and normally engaging with the latch and holding it in its latching position, having an arm adapted to be engaged by the hook of the register when the latter is in its safely-attached position, all arranged and operating to prevent the entrance of the latching-lugs, unless the register is in its proper engaging position with relation to the base, substantially as described.

6. In a fare-register, in combination with the actuating devices thereof, including a cord, a sheave or cord-guide, located on the actuating devices, and engaged by a free loop of the cord.

7. In a fare-register, the combination of a cord, and of an actuating-lever, provided with a sheave or guide engaging with a free-running loop or bight of the cord, substantially as described.

8. In a fare-register, in combination with a dial for indicating in visible characters the direction of a trip, and arranged to be moved to positions representing two or more directions, said dial being provided with impressing-type corresponding to the visible indications, the impressing-type being at the recording position when its corresponding character is visible at the indicating position, substantially as described.

9. In a fare-register, in combination with devices adapted to give an impression of the fares registered, the herein-described direction indicating and recording device, provided with a visible portion for indicating the direction of the trips, and having an impressing portion located in line with the fare-impressing characters when its corresponding indication is at the visible position, substantially as described.

10. In a fare-register, in combination with impressing-wheels, for giving a record of the fares registered, the herein-described direction indicating and recording device, provided with a set of impressing-characters for each direction to be indicated, each set being in line with the recording-figures of the register when its corresponding visible characters are at their indicating position, all arranged and operating to show along with each numerical impression the direction of the trip upon which it was made.

11. In combination with the recording mechanism of a fare-register, a direction-recording device provided with a dial, having characters thereon indicative of the directions in which the trips are made, and arranged with relation to the case of the register so as to expose but one of the direction-indicating characters at a time, the said direction-recording device being provided with corresponding impressing-type, each of which is brought into line with the fare-recording type of the register when its corresponding visible indicating character is exposed to view, all arranged and operating to impress upon the record in line with the numerical record of the fares taken upon a given trip, the direction shown upon its visible indicator at the time when that numerical record is taken, substantially as described.

12. In a fare-register, in combination, the trip-record-impressing mechanism, devices for indicating upon the record the direction of each trip, and impressing-type for indicating upon the record the number of the car or the register on which the record is taken, substantially as described.

13. In a fare-register, in combination with the units-dial ratchet thereof, a bell-lever located adjacent to that ratchet, and a pawl located adjacent thereto during the registering actuations, communicating each forward registering impulse of the ratchet to the bell-lever, the pawl being withdrawn therefrom during the resetting operation of the ratchet, whereby the bell is not actuated during those resetting actuations, substantially as described.

14. In a register of the class specified, in combination with the units-ratchet thereof, arranged to be reset to its zero position, and with the resetting-pawl thereof, held in its forward position during the registering actuations of the ratchet, the herein-described bell mechanism, having its lever located adjacent to the resetting-pawl so as to be raised by means of that pawl at each of the registering actuations of the ratchet, substantially as described.

15. In a fare-register of the class specified, in combination with the units-ratchet thereof, and with the bell mechanism having its actuating-lever located adjacent to the units-ratchet, the herein-described resetting-pawl, adapted to be held during the registering actuations of the ratchet in engaging relation to the bell-lever, whereby the latter is moved by those actuations through the medium of the pawl, the latter being drawn back clear of the bell-lever during the operation of resetting the ratchet to zero, substantially as described.

16. In combination with the dial of a counting device, the herein-described stop device consisting of a stop-pawl pivoted in a fixed relation to the counting device, and pressed into engagement with the dial, that dial being provided with a stop-notch whereby its rotation is stopped at the desired position, substantially as described.

17. In a registering or counting machine of the class specified, in combination with the dials thereof, each provided with a stop-notch located in suitable relation to their zero position, the herein-described stop device consisting of a series of pawls located in a fixed relation to the machine, and pressed into engagement with the stop-notches of their respective dials, all arranged and operating to positively stop the dials at the completion of the operation of setting them to zero.

18. In combination with the dial of a registering or counting device, provided with suitable teeth and with a pawl for the rotation thereof, and provided also with a stop-recess located in suitable relation to the desired stopping position of the dial, a stop-pawl mounted adjacent thereto and adapted to enter the recess of the dial when the latter is in suitable position therefor, the stop-pawl when in this position holding the actuating-pawl out of engaging relation with the dial-teeth.

19. In combination with the dial of a registering or counting device, provided with suitable teeth for the rotation of the dial, and provided also with a stop-recess located in suitable relation to the desired stopping position of the dial, an actuating-pawl for engaging with and rotating the dial, and a stop-pawl pressed into engagement with the dial, having a shoulder which is moved into engagement with the actuating-pawl so as to hold it out of engagement with its teeth when the position of the dial allows the stop-pawl to drop into the stop-recess thereof, substantially as described.

20. In combination with the dial of a registering or counting device, provided with suitable teeth for the rotation thereof, and provided with a stop-recess located in suitable relation to the zero position of the dial, the herein-described resetting device consisting of an actuating-pawl having a working face pressed into engagement with the ratchet, and a stop-pawl mounted adjacent to and pressed into engagement with a dial in the plane of its stop-recess, having a shoulder engaging with the heel of the actuating-pawl when the stop-pawl is allowed to drop into the stop-recess of the dial, all arranged and operating to hold the actuating-pawl out of an engagement with its dial when the latter is at its zero position, substantially as described.

21. In combination with the dial of a registering or counting device, provided with suitable teeth for the rotation thereof, and with a single stop notch or recess located in suitable relation to its zero position, the herein-described resetting device, consisting of a stop-pawl pressed into engagement with the dial in the plane of the stop-recess thereof, an actuating-pawl engaging with the teeth of the dial, located in the plane of the stop-pawl and adjacent thereto, and adapted to reciprocate toward and from that pawl in the operation of rotating the dial, the actuating-pawl being provided with a projection or heel for engaging with a shoulder of the stop-pawl when the latter has dropped into the stop-recess in the dial, whereby the actuating-pawl is held out of engagement with the teeth of its dial when the latter is in its zero position, substantially as described.

22. In a registering or counting device, the combination of a series of dials arranged side by side, each provided with teeth for the rotation thereof, and with a stop-recess located in suitable relation to the zero position of its dial, a series of stop-pawls, each independently pressed into engagement with their respective dials in the plane of the stop-recesses thereof, and a series of actuating-pawls independently pivoted adjacent to their respective dial-teeth, and arranged to reciprocate toward and from their respective stop-pawls in the operation of rotating their dials, each of said actuating-pawls being independently held out of engagement with its dial by its stop-pawl when the latter drops into the stop-recess of its dial, substantially as described.

23. In a registering or counting device, in combination with the dial thereof, and with the resetting devices therefor, means governed by the dial engaging with and locking the resetting devices against further movement in either their forward or backward direction when the dial has been brought to its zero position, substantially as described.

24. In a registering or counting device, in combination with the dial thereof, and with resetting devices therefor, a locking-arm governed by the dials, and engaging with and locking the resetting devices against further movement in either a forward or a backward direction when the last of the dials has been brought to its zero position, substantially as described.

25. In a registering or counting device, in combination with the dial thereof, and with a resetting-arm therefor, a locking-arm located in engaging relation to the resetting-arm, the position of the locking-arm in its relation to the resetting-arm being governed by the dial, substantially as described.

26. In a registering or counting machine, in combination with its dial, provided with a stop-recess and with a reciprocating actuating-arm therefor, the herein-described zero-stop device for that arm, consisting of a locking-arm pivotally mounted adjacent thereto, having a member located in engaging relation to the actuating-arm, and having a member normally pressed into engagement with the dial in the plane of the stop-recess thereof, all arranged and operating to engage with and lock the actuating-arm when the dial is in a position which allows its engaging member of the locking device to enter the stop-recess, substantially as described.

27. In a registering or counting machine, in combination with its dial and with actuating means therefor, a locking device consisting of a member normally pressed to or toward its engaging relation with the actuating means, and of a member engaging with the dial, whereby the locking device is held out of engaging relation to the actuating means at the desired free positions of the dial, substantially as described.

28. In a registering or counting machine, in combination with a series of dials and with actuating means therefor, a locking device consisting of a member normally pressed to or toward its engaging relation with the actuating means, and of a series of independent members each pressed into engagement with its dial, and operatively connected with the locking member, all arranged and operating to hold that arm out of its engaging relation with the actuating means until all of the dials have been moved to their predetermined position, substantially as described.

29. In a registering or counting machine, in combination with a series of dials, and with actuating means therefor, for moving those dials to their zero or other predetermined position, the herein-described locking device consisting of a locking-arm located in the plane of movement of the actuating means and normally pressed toward engaging relation therewith, and a series of independent stop-pawls, each pressed into engagement with its dial and operatively connected with the locking-arm, all arranged and operating to hold that arm out of its engaging relation with the dial-actuating means, until all of the dials have been moved to their zero or other predetermined position, substantially as described.

30. In combination with the dial of a registering or counting device, the herein-described independent means of actuating the dial, consisting of a plurality of pawl-carrying arms journaled concentrically with the dial, and having their bearings one within the other, substantially as described.

31. In a fare-register, in combination with a series of dials mounted side by side, the herein-described means of independently actuating those dials, consisting of arms each provided with pawls adapted to engage the dials, said arms being supported upon independent bearings which are journaled one within the other concentrically with the dials, substantially as described.

32. In a fare-register, in combination with the case thereof, and with a series of dials mounted side by side within the case, the herein-described means of independently actuating those dials from the exterior of the case, consisting of a plurality of levers provided with hubs which are journaled in the case one within the other concentrically with the dials, each hub having a pawl-carrying arm secured to its inner end whereby the dials may be actuated by means of either lever independently of the other lever, substantially as described.

33. In a fare-register, in combination with its frame or casing, and with a series of dials arranged side by side within that casing, the herein-described independent means for registering and for resetting the dials, consisting of registering and resetting levers located upon the outside of the case and provided with hubs journaled one within the other and extending through the wall of the case to its interior, with pawl-carrying arms fixed to the inner ends of the registering-lever and the resetting-lever respectively, substantially as described.

34. In a fare-register of the class specified, the herein-described recording device consisting of a drum adapted to hold a paper strip, and of a lever upon which that drum is rotatably mounted, provided with a detent for holding the drum in a fixed relation to the lever whenever the latter is moved in one direction, with a pawl for partially rotating the drum with relation to the lever as the latter is moved in the opposite direction, substantially as described.

35. In a fare-register of the class specified, the herein-described recording device, consisting of a drum provided with ratchet-teeth and adapted to hold a paper strip, and a lever upon which that drum is rotatably mounted, provided with a detent for holding the drum in a fixed relation to the lever while the latter is moved in one direction, and provided also with a pawl pivoted concentrically with the drum for partially rotating the drum with relation to the lever as the latter is moved in the opposite direction, substantially as described.

36. In a fare-register, in combination with an externally-visible dial, provided with a series of numerals, and with an impressing-wheel operatively connected therewith, having thereon a corresponding series of impressing-characters, a recording device, consisting of a paper-carrying drum rotatably mounted adjacent to the type or impressing-wheel adapted to be pressed into engagement therewith, substantially as described.

37. In a fare-register, in combination with the case and the door thereof, a recording-arm located adjacent to the door-opening and having a paper-carrying drum revolubly mounted thereon, the door in its closed position forming an end bearing for the drum, substantially as described.

38. In a device of the class specified, in combination with the registering and recording mechanisms thereof, the herein-described interlocking device for preventing the operation of one of those devices while the other is being operated, consisting of arms operatively connected to each of the mechanisms and lying in the same plane, the inner or engaging surface of each being curved to agree with the sweep of the end of the other of those arms, whereby the end of either of those arms when in its operating position serves as a stop for the other, substantially as described.

39. In a fare-register, the combination with the resetting mechanism thereof, of a locking-arm for said mechanism, a catch, and a latch to engage with and lock the resetting mechanism out of operation.

40. In a fare-register, the combination with the registering mechanism, and the resetting mechanism thereof, of two coacting stops, one operative with the registering mechanism, and the other serving as a latch to hold the resetting mechanism out of operation, the stops serving reciprocally to prevent concurrent operation of their respective mechanisms.

41. In a fare-register, in combination with the registering and the resetting mechanisms thereof, the latter being provided with a locking-arm and a catch, an interlocking device, consisting of a latch engaging with and locking the resetting mechanism, provided with a member located in engaging relation to another member which is movable with the registering mechanism, whereby the latch is prevented from releasing the resetting mechanism excepting when the registering mechanism is in its backward or non-operating position, substantially as described.

42. In a fare-register, in combination with the registering mechanism and the resetting mechanism thereof, the latter being provided with a locking-arm and with a catch, a latch resting upon the end of the catch when the latter is unlocked, and having a member engaging with and preventing movement of the registering mechanism when the catch is in its unlocked position, substantially as described.

43. In a fare-register, in combination with the recording and the resetting mechanisms thereof, the latter being provided with a locking-arm, and with a catch, a latch operatively connected with the recording mechanism and engaging with the catch, whereby the locking-arm is held in locking relation to the resetting mechanism.

44. In a fare-register, in combination with the recording and the resetting mechanisms thereof, the latter being provided with a locking-arm and with a catch, a latch engaging with the catch, and locking the resetting mechanism out of operation, the latch being so connected with the recording mechanism as to release the catch at the completion of the recording operations, substantially as described.

45. In a machine of the class specified, in combination with the recording mechanism, and with the stop-pawls for the dials thereof, the pawls being provided with a catch, a latch operatively connected with the recording device, engaging with the catch so as to hold the stop-pawls out of engagement with their dials, and releasing that catch upon the completion of the recording operation, substantially as described.

46. In a fare-register, in combination with the recording and the resetting mechanisms thereof, an interlocking device therefor, consisting of two lugs or projections, each so located upon its mechanism as to be carried by the operation thereof into the path of movement of the other, substantially as described.

47. In a fare-register, in combination with the recording and the resetting mechanisms thereof, an interlocking device therefor, consisting of projecting members or lugs, each located upon the recording and the resetting mechanisms respectively at points which are movable therewith at right angles to each other, each when at rest lying out of the path or sweep of the other, but being moved into that path or sweep by the operation of their respective parts, all arranged and operating to prevent the simultaneous or contemporaneous movement of those two mechanisms, substantially as described.

48. In a fare-register, in combination with the resetting mechanism thereof, an interlocking device for preventing the resetting mechanism from being thrown out of operation before the completion thereof, consisting of a locking-arm engaging the resetting devices and a pawl normally pressed into engagement with the locking-arm, the latter being provided with a step or tooth engaging with the pawl and preventing the raising of that arm before the completion of the resetting operation, substantially as described.

49. In a fare-register, in combination with the dials, and with the resetting mechanism thereof, an interlocking device therefor, consisting of a locking-arm operatively connected with and supported by members which rest in contact with the dials to be reset, an interlocking pawl, as 113, pivotally mounted adjacent to the locking-arm and yieldingly pressed into engagement therewith, the engaging face of the locking-arm being provided with a step or tooth engaging with that pawl, all arranged and operating to prevent the raising of the locking-arm until all of the dials have been brought to zero or to predetermined positions, substantially as described.

50. In a fare-register, in combination with the resetting and the recording mechanisms, and with an interlocking latch therefor, a ratchet operatively connected with the recording mechanism and with the latch, and provided with teeth which face in the direction of the return movement thereof, a pawl pivoted adjacent thereto and pressed into contact with the teeth of the ratchet during its forward movement, all arranged and operating to prevent premature return movement of the ratchet and interlocking latch, whereby the concurrent movement of the recording and the resetting mechanisms is positively prevented, substantially as described.

51. In a fare-register, in combination with the registering, the recording and the resetting mechanisms, and with an interlocking latch therefor, a ratchet operatively connected with the recording mechanism and with the latch, and provided with teeth which face in the direction of the return movement of the ratchet, a pawl operatively connected with the resetting mechanism and yieldingly pressed into contact with the teeth of the ratchet during its forward movement, arranged to be released therefrom as the resetting mechanism is released from the latch at the completion of the recording operation, whereby concurrent movement of any two of those three mechanisms is positively prevented.

W. H. HONISS.

Witnesses:
R. P. CHAPMAN,
JENNIE NELLIS.